(12) United States Patent
Nakayama

(10) Patent No.: US 6,904,177 B2
(45) Date of Patent: Jun. 7, 2005

(54) FILTER PROCESSING APPARATUS

(75) Inventor: Tadayoshi Nakayama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 496 days.

(21) Appl. No.: 10/092,573

(22) Filed: Mar. 8, 2002

(65) Prior Publication Data

US 2002/0168113 A1 Nov. 14, 2002

(30) Foreign Application Priority Data

Mar. 13, 2001 (JP) ........................... 2001-071092
May 21, 2001 (JP) ........................... 2001-151524
Jan. 31, 2002 (JP) ........................... 2002-024110

(51) Int. Cl.[7] .................................. G06K 9/36
(52) U.S. Cl. ..................... 382/240; 382/239; 382/248; 382/251
(58) Field of Search ........................ 382/240, 239, 382/251, 248; 348/441; 358/429, 426; 341/50; 375/245

(56) References Cited

U.S. PATENT DOCUMENTS 5,737,448 A * 4/1998 Gardos ..................... 382/240
6,201,897 B1 * 3/2001 Nixon ....................... 382/248
6,385,329 B1 * 5/2002 Sharma et al. .............. 382/100
6,798,917 B2 * 9/2004 Fujiwara et al. ............ 382/240

FOREIGN PATENT DOCUMENTS

JP        404315824 A  * 11/1992  ............ G11B/7/08
JP        10-288342      10/1998  ............ G06F/17/14

OTHER PUBLICATIONS

Simon et al., "CORDIC–Based Architectures for Efficient Implementation of Discrete Wavelet Transforms", IEEE International Symposium on Circuits and Systems, vol. 4, 5–1996, pp. 77–80.*

* cited by examiner

Primary Examiner—Anh Hong Do
(74) Attorney, Agent, or Firm—Fitzpatrick, Cella, Harper & Scinto

(57) ABSTRACT

A two-dimensional wavelet transform processing apparatus, more effectively utilizing hardware resource, is realized with reduced hardware construction. For this purpose, the filter processing apparatus has a vertical DWT processor (901) for performing filter processing on image data and outputting 2 types of data obtained by the processing as 1 pair of data, a rotation unit (903) for rearranging the data outputted from the vertical DWT processor by rotating the data by 90° by 2 pairs and outputting the data, and a horizontal DWT processor (905) for performing filter processing on the image data rearranged by the rotation unit and outputting 2 types of data obtained by the processing as 1 pair of data.

21 Claims, 33 Drawing Sheets

FILTER PROCESSING APPARATUS

BACKGROUND OF THE INVENTION

The present invention relates to a filter processing apparatus, and more particularly, to a filter processing apparatus which performs wavelet transform on image data, inverse transform on a wavelet-transformed coefficients to reproduce image data, and the like.

FIELD OF THE INVENTION

As an image, especially a multivalue image, includes an enormous amount of information, the enormous amount of data causes a problem upon storage or transmission of the image. Accordingly, a high-efficiency coding is employed for storage and transmission of image. According to this method, to reduce the amount of data, the contents of image are changed to eliminate redundancy of the image to a level that degradation of image quality is visually unrecognizable.

For example, in the JPEG method recommended by the ISO and the ITU-T as international standard still-image coding method, each block (8 pixels×8 pixels) of image data is discrete-cosine transformed (DCT) by each block (8 pixels×8 pixels) into DCT coefficients, then the respective coefficients are quantized and further entropy-encoded, thereby the image data is compressed. However, in this method, as DCT and quantization is performed in block units, so-called block distortion may appear in a border between blocks of decoded image.

On the other hand, JPEG 2000 is studied as a new international standard still-picture coding method. In JPEG 2000, wavelet transform is proposed as conversion processing performed prior to quantization. Different from the current JPEG method, in the wavelet transform, processing is not performed in block units but continuously performed on input data. This method has an advantage that degradation of image quality is visually unrecognizable.

In the wavelet transform used in JPEG 2000, processing is performed by a method called lifting mechanism, thereby the transform processing can be efficiently performed with a small amount of calculation.

FIG. 12 shows a forward lifting mechanism. FIG. 13 shows a signal flow in an inverse lifting mechanism. In the figures, symbols α, β, γ, δ are lifting coefficients.

First, the operation of the lifting mechanism in FIG. 12 will be described.

Input pixels are represented as $X_0$, $X_1$, $X_2$, $X_3$, $X_4$, $X_5$, ..., in the input order. The input pixels are classified into even-numbered pixel group and odd-numbered pixel group by a separation unit 201. The pixels $X_0$, $X_2$, $X_4$, ... (i.e., $X_{2n}$) with even-numbered subscripts are outputted from one output terminal (upper side in FIG. 12) of the separation unit 201. The pixels $X_1$, $X_3$, $X_5$, ... (i.e., $X_{2n+1}$) with odd-numbered subscripts are outputted from the other output terminal (lower side in FIG. 12) of the separation unit 201.

In the lifting processing in the initial stage, the even-numbered pixel group is multiplied by the lifting coefficient α, and the result of multiplication between 2 continuous even-numbered pixels is added to a pixel of the odd-numbered pixel group positioned at the center of the 2 pixels.

This processing is expressed as follows.

$$D_{2n+1} = X_{2n+1} + \alpha \cdot X_{2n} + \alpha \cdot X_{2n+2} \quad (1)$$

In the lifting processing in the second stage, the newly-obtained odd-numbered pixel group $D_1$, $D_3$, $D_5$, ... is multiplied by the lifting coefficient β, and the result of multiplication between 2 continuous odd-numbered pixels is added to a pixel of the even-numbered pixel group positioned at the center of the 2 pixels.

This processing is expressed as follows.

$$E_{2n+2} = X_{2n+2} + \beta \cdot D_{2n+1} + \beta \cdot D_{2n+3} \quad (2)$$

In the lifting processing in the third stage, similar processing to that of the initial stage is performed by using the lifting coefficient γ. In the lifting processing in the fourth stage, similar processing to that of the second stage is performed by using the lifting coefficient δ. Expressions of the lifting processings in the third and fourth stages are as follows.

$$H_{2n+1} = D_{2n+1} + \gamma \cdot E_{2n} + \gamma \cdot E_{2n+2} \quad (3)$$

$$L_{2n+2} = E_{2n+2} + \delta \cdot H_{2n+1} + \delta \cdot H_{2n+3} \quad (4)$$

Further, in FIG. 12, K normalizes the wavelet coefficient. As the normalization is not particularly related to the nature of the present invention, the explanation of this processing will be omitted.

If the normalization processing is ignored, $H_n$ and $L_n$ obtained by the lifting processing in the third and fourth stages correspond to a high-frequency transform coefficient and a low-frequency transform coefficient, respectively.

Next, the signal flow of the inverse lifting mechanism in FIG. 13 will be briefly described. First, in correspondence with the normalization processing in the forward lifting mechanism, multiplication by inverse coefficients is performed, and lifting processing is performed in 4 stages. The contents of the processing in the respective stages are expressed as follows.

(1st stage) $E_{2n+2} = L_{2n+2} - \delta \cdot H_{2n+1} - \delta \cdot H_{2n+3}$ (5)

(2nd stage) $D_{2n+1} = H_{2n+1} - \gamma \cdot E_{2n} - \gamma \cdot E_{2n+2}$ (6)

(3rd stage) $X_{2n+2} = E_{2n+2} - \beta \cdot D_{2n+1} - \beta \cdot D_{2n+3}$ (7)

(4th stage) $X_{2n+1} = D_{2n+1} - \alpha \cdot X_{2n} - \alpha \cdot X_{2n+2}$ (8)

The above expressions (5) to (8) are respectively obtained by transposing the terms of the expressions (4) to (1).

FIGS. 14 and 15 show a lifting grid structure as representation of the lifting mechanism in FIGS. 12 and 13 from another viewpoint. In FIGS. 14 and 15, "□" indicates input data; "○", a grid point (or grid point data calculation unit); and an arrow from each "○", the flow of grid point data. In these figures, the basic processing (processing in the expressions (1) to (8)) in the lifting mechanism and data newly-obtained from the processing correspond to the respective grid points.

In the forward lifting grid structure in FIG. 14, 1 grid point data is calculated by using any one of the expressions (1) to (4).

In the inverse lifting grid structure in FIG. 15, 1 grid point data is calculated by using any one of the expressions (5) to (8).

In a general filter, when 1 data is inputted, 1 output is calculated, however, as it is understood from the lifting grid structure in FIG. 14, in the lifting calculation processing, 2 data outputs can be made when 2 data are newly prepared.

For example, regarding the input data up to $X_8$, output data up to $L_4$ and $H_5$ can be calculated. Even if only $X_9$ is newly prepared, no grid point data can be newly calculated. However, when $X_{10}$ is prepared, $D_9$, $E_8$, $H_7$ and $L_6$ can be newly calculated. Further, when 2 input data $X_{11}$ and $X_{12}$ are prepared, output data $H_9$ and $L_8$ can be calculated.

In this manner, in the filter processing based on the lifting calculation, when 2 input data are newly prepared, 2 output data (transform coefficients) can be calculated. Also, in the inverse transform processing as shown in FIG. 15, when 2 transform coefficients are prepared, 2 decoded data can be calculated.

Further, in the inverse transform processing in a vertical direction, when 2 types (low-frequency and high-frequency) of transform coefficients for 9 lines are inputted in the horizontal scan order, decoded data for 2 lines are simultaneously calculated in the horizontal scan order and outputted.

The filter processing by lifting calculation (wavelet transform) greatly differs from the other filter processings in this point.

As described above, the low-frequency and high-frequency transform coefficients, outputted in pairs from a wavelet transform unit for horizontal (or vertical) wavelet transform, are respectively processed by the next wavelet transform unit for vertical (or horizontal) wavelet transform. Thus horizontal and vertical two-dimensional wavelet transform processing is performed by the 2 transform processings.

As the processor which performs the two-dimensional wavelet transform, Japanese Published Unexamined Patent Application No. Hei 10-283342 discloses a construction as shown in FIG. 16. In the figure, reference numeral 501 denotes a horizontal one-dimensional DWT (Discrete Wavelet Transform) processor (hereinbelow, referred to as a "horizontal DWT processor"); 503 and 505, vertical one-dimensional DWT processors (hereinbelow, referred to as "vertical DWT processors"); and 511, 513, buffers.

The horizontal DWT processor 501 receives and processes raster scan data obtained from horizontal scanning, and outputs 2 horizontal low-frequency and high-frequency transform coefficients by each processing. The low-frequency and high-frequency transform coefficients respectively for 1 horizontal line are stored in the buffers 511 and 513.

On the other hand, in the vertical DWT processors 503 and 505, immediately after a vertical one-dimensional wavelet transform processing, transform coefficients for plural lines used in the transform processing are stored in their internal buffers. When the transform processing is completed, the transform coefficients for 2 lines are unnecessary. When transform coefficients for new 2 lines are inputted from the horizontal DWT processor 501 and the buffers 511 and 513, the next vertical wavelet transform processing can be performed. Then, the vertical DWT processors 503 and 505 perform calculation by using the input new sets of transform coefficients, and output vertical low-frequency and high-frequency transform coefficients, respectively.

In this manner, by the 2 types (horizontal and vertical) wavelet transform processings, the vertical DWT processor 503 outputs 2 types of transform coefficients, LL (vertical low-frequency, horizontal low-frequency) and HL (vertical-high-frequency, horizontal low-frequency), and the vertical DWT processor 505, 2 types of transform coefficients, LH (vertical low-frequency, horizontal high-frequency) and HH (vertical high-frequency, horizontal high-frequency).

In the construction of FIG. 16, the horizontal DWT processor 501 can be operated at 100% availability by inputting 2 data at every cycle. On the other hand, the 2 vertical DWT processors 503 and 505 stop when transform coefficients for the next horizontal 1 line are stored in the buffers 511 and 513, and when transform coefficients for the next second line are inputted from the horizontal DWT processor 501 into the vertical DWT processors 503 and 505, the transform coefficients stored in the buffers 511 and 513 are read, thereby vertical wavelet transform processing is performed by using the transform coefficients for 2 lines.

Accordingly, the period in which the 2 vertical DWT processors 503 and 505 operate equals the period in which the horizontal DWT processor 501 processes transform coefficients for the second line of the 2-line transform coefficients inputted into the vertical DWT processors 503 and 505. That is, the 2 vertical DWT processors respectively operate at 50% availability.

As described above, in the conventional two-dimensional wavelet transform processing, at the vertical transform processing, 2 transform processors are required. That is, to process the same amount of data, 1 transform processor is employed in the former stage, while 2 transform processors are employed in the latter stage. Thus hardware resource cannot be effectively utilized, and further, the circuit scale increases.

SUMMARY OF THE INVENTION

The present invention has been made in consideration of the above problems, and has its object to realize a two-dimensional wavelet transform processing apparatus, more effectively utilizing hardware resource, with reduced hardware construction.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
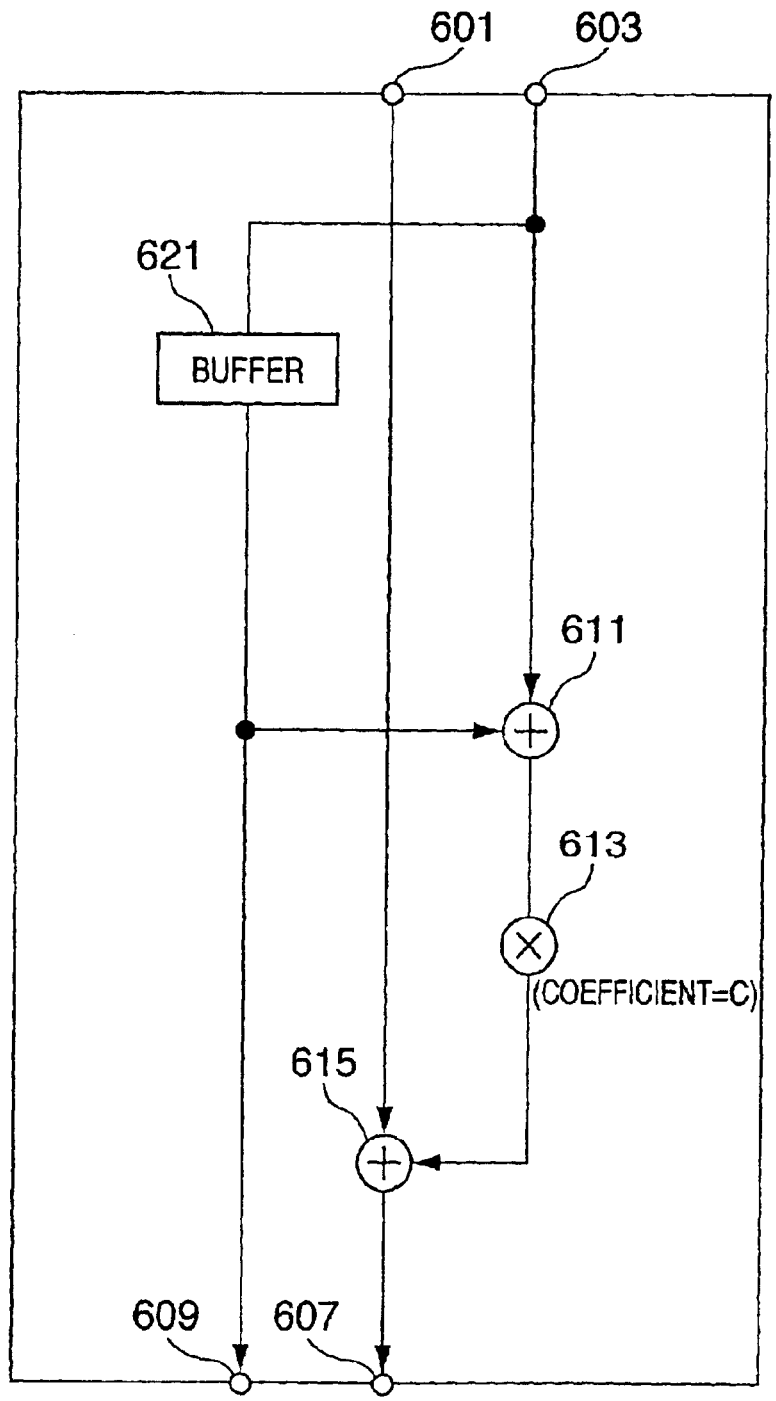
FIG. 1 is a block diagram showing the construction of a calculation unit according to embodiments of the present invention.
Figure 2:
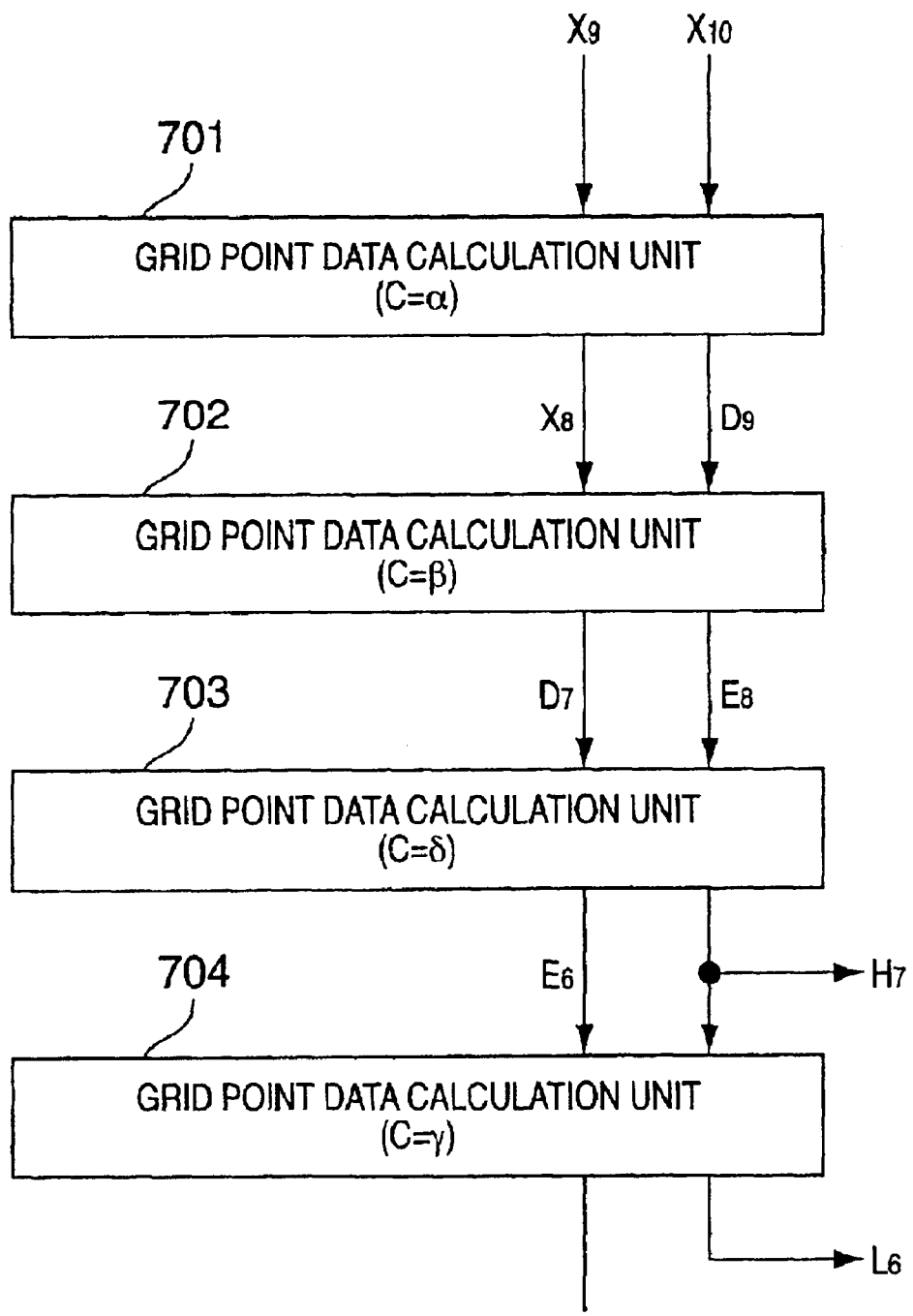
FIG. 2 is a block diagram showing the construction using the calculation unit in FIG. 1 in multiple stages, for lifting calculation for filter processing.
Figure 14:
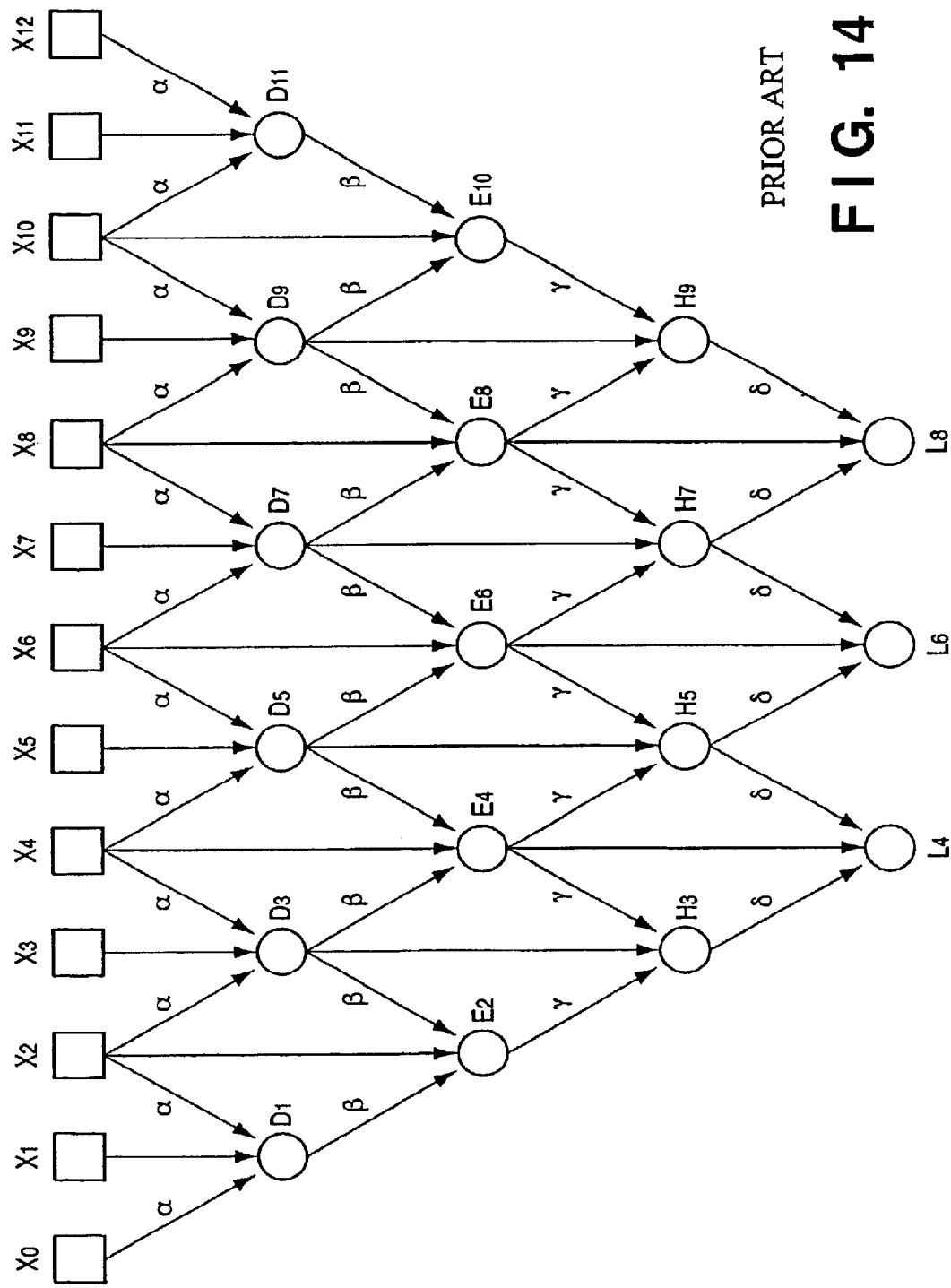
FIG. 14 is a schematic diagram showing the lifting grid structure realizing the lifting calculation of the 9×7 filter processing.
Figure 15:
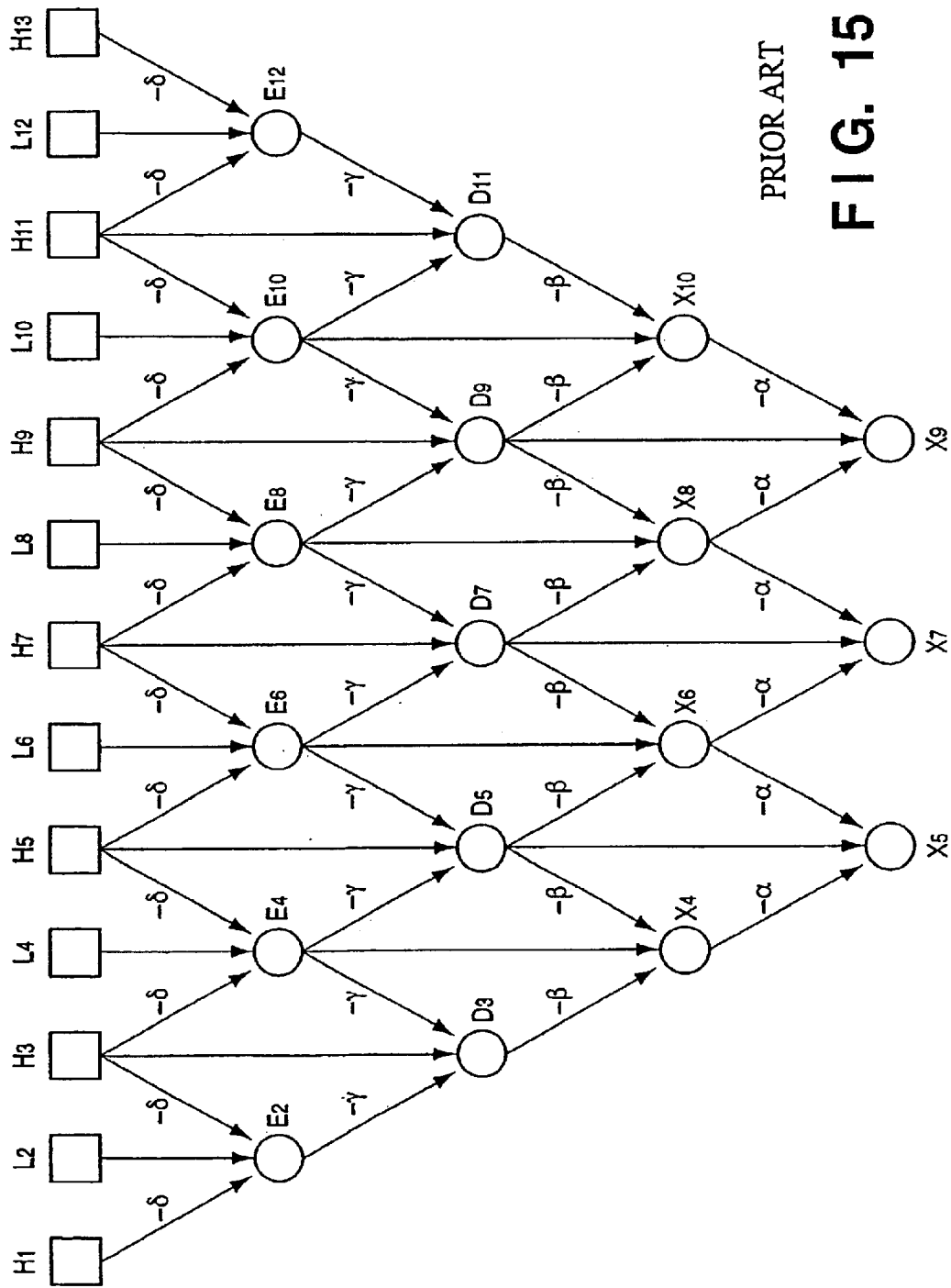
FIG. 15 is a schematic diagram showing the lifting grid structure realizing the lifting calculation of the inverse 9×7 filter processing.
Figure 16:
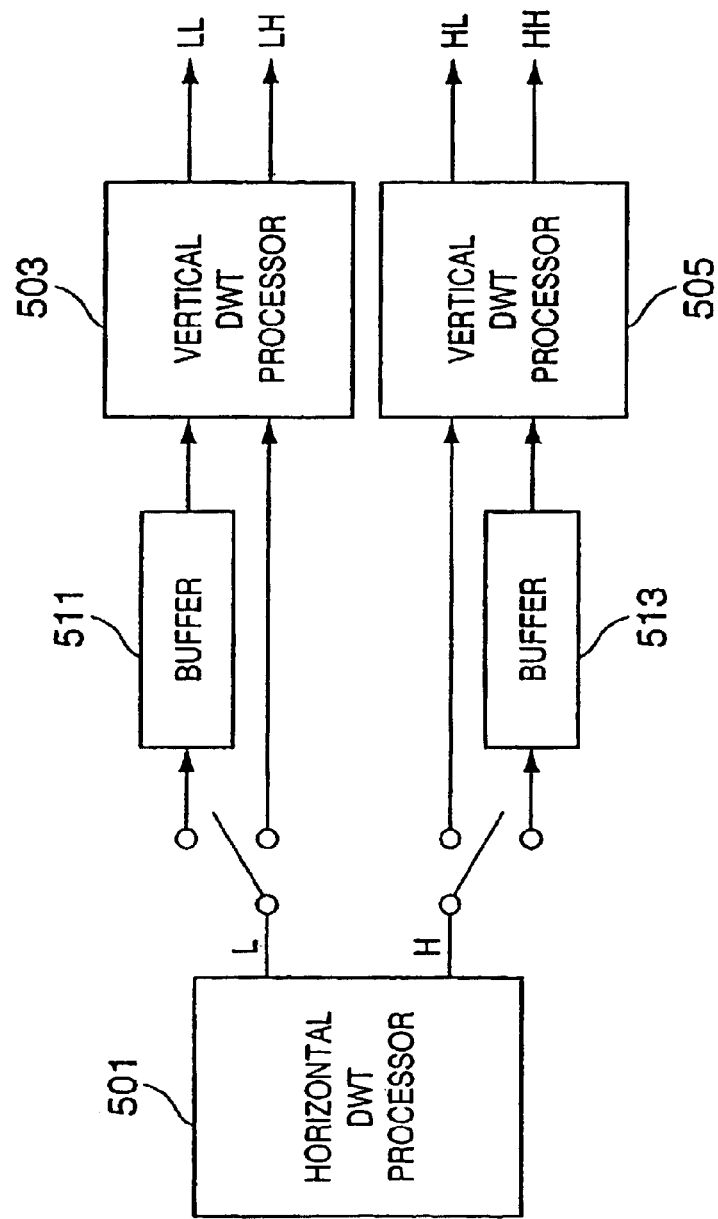
FIG. 16 is a block diagram showing the construction of the conventional two-dimensional wavelet transform processing apparatus.

The inventor has designed a construction in FIG. 1 as a grid point data calculation unit in each grid point as shown in FIG. 14. FIG. 2 shows a construction using the grid point data calculation unit in FIG. 1 in multiple stages for lifting calculation for filtering processing.

In FIG. 1, numerals 601 and 603 denote terminals for inputting 2 data; 607, a terminal for outputting calculated grid point data; 621, a buffer for storing the input data from the terminal 603; 609, a terminal for outputting output data from the buffer 621; 611, an adder for adding the output data from the buffer 621 to the input data from the terminal 603; 613, a multiplier for multiplying the result of addition by the adder 611 by a coefficient C (any 1 of $\alpha$, $\beta$, $\gamma$ and $\delta$); and 615, an adder for adding the result of multiplication by the multiplier 613 to input data positioned at the center of 3 data used in calculation.

First, the outline of calculation method in the embodiments of the present invention will be briefly described with reference to FIGS. 14, 1 and 2. Note that in the following description, data outputted from respective grid points in FIG. 14 will have the same reference numerals as those of the grid points.

For example, in a case where 9 input data $X_0$, $X_1$, $X_2$, $X_3$, $X_4$, $X_5$, $X_6$, $X_7$ and $X_8$ are processed, a low-frequency transform coefficient $L_4$ and a high-frequency transform coefficient $H_5$ are outputted by calculating 10 grid point data ($D_1$, $D_3$, $D_5$, $D_7$, $E_2$, $E_4$, $E_6$, $H_3$, $H_5$ and $L_4$).

Next, if 2 input data $X_9$ and $X_{10}$ are newly added, a low-frequency transform coefficient $L_6$ and a high-frequency transform coefficient $H_7$ are outputted by calculating 10 grid point data as in the case of the above processing. However, if the grid point data calculated prior to input of the data $X_9$ and $X_{10}$ are utilized, only 4 data, $D_9$, $E_8$, $H_7$ and $L_6$ are calculated.

To utilize previously-calculated grid point data, a medium for storing the calculated grid point data is required. The medium is a buffer 621 in FIG. 1.

In FIG. 2, except a buffer in a top stage grid point data calculation unit 701 used for storing previously-input data instead of previously-calculated grid point data, buffers in the other grid point data calculation units are used for storing previously-calculated grid point data. The minimum size of the buffers is 1 and there is no upper limit.

When the processing using the data $X_0$ to $X_8$ has been already completed, to output the low-frequency transform coefficient $L_6$ and the high-frequency transform coefficient $H_7$, the top stage grid point data calculation unit 701 inputs the new input data $X_9$ and $X_{10}$. The grid point data calculation unit 701 calculates the grid point data $D_9$. The data $X_8$ necessary for this calculation as well as the input data $X_9$ and $X_{10}$ is outputted from the buffer 621 in FIG. 1. The data $X_8$ has been stored into the buffer 621 when it has been inputted from the terminal 603 in the previous processing.

The grid point data calculation unit 701 outputs the calculated data $D_9$ and the output $X_8$ from the buffer 621, from the terminals 607 and 609, to outside the unit, to send them to the next grid point data calculation unit 702.

The grid point data calculation unit 702 calculates the data $E_8$ by using the input data $D_9$ and $X_8$. The data $D_7$ also necessary for this calculation is outputted from the buffer 621 in the unit 702. The data $D_7$ has been stored into the buffer 621 when it has been inputted from the terminal 603. The unit 702 outputs the calculated data $E_8$ and the output $D_7$ from the buffer 621, from the terminals 607 and 609, to the outside the unit, to send them to the next grid point data calculation unit 703.

The grid point data calculation units 703 and 704 perform similar processing to the above processing. As a result, the calculation unit 703 outputs the high-frequency transform coefficient $H_7$ and the calculation unit 704 outputs the low-frequency transform coefficient $L_6$.

Hereinafter, each time 2 data are newly inputted into the calculation unit 701, the calculation units 703 and 704 output a high-frequency coefficient and a low-frequency coefficient.

Figure 17:
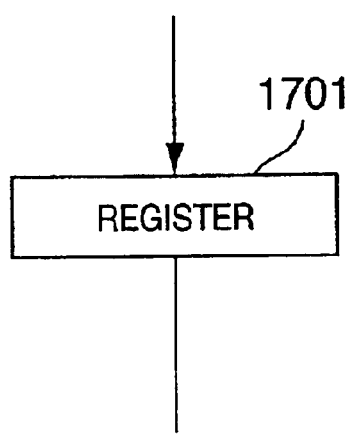
FIG. 17 is a block diagram showing a buffer in FIG. 1 constructed with a first stage of register.
Figure 18:
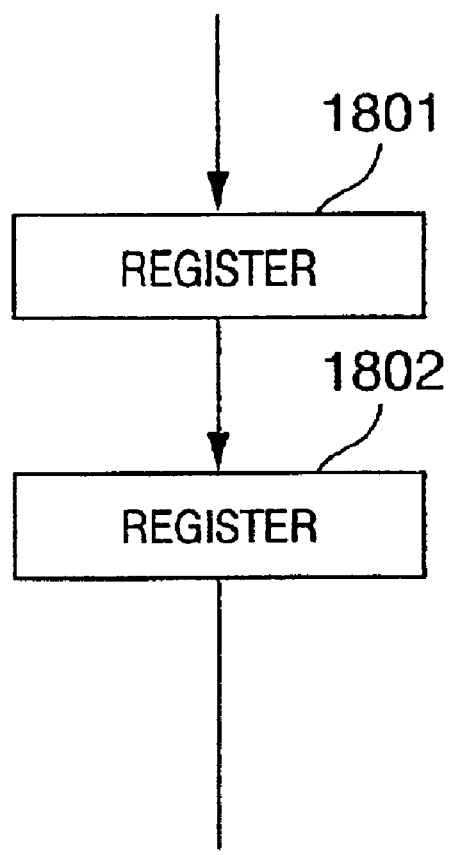
FIG. 18 is a block diagram showing the buffer in FIG. 1 constructed with 2 stages of registers.
Figure 19:
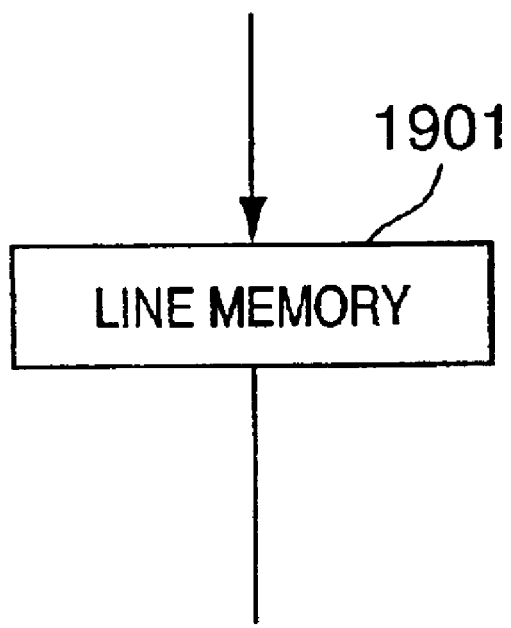
FIG. 19 is a block diagram showing the buffer in FIG. 1 constructed with a line memory.

As shown in FIG. 17, if the buffer 621 in FIG. 1 is constructed with only 1 stage of register 1701 for storing data for 1 pixel, horizontal wavelet transform processing can be performed as in the case of the conventional art. As shown in FIG. 18, if the buffer 621 is constructed with 2 stages of registers 1801 and 1802 respectively for storing data for 1 pixel, wavelet transform processing can be performed on 2 types of signals by alternately processing the 2 types of signals, as described later. In the flow of data in FIG. 18, first, the data is inputted into the register 1801 from a higher position in the figure, then shifted to the register 1802 at the next timing, and further, outputted from a lower position in the figure at the next timing. Further, as shown in FIG. 19, if the buffer 621 is constructed with a line memory 1901 for storing data for 1 line image, vertical wavelet transform processing can be performed.

<First Embodiment>

Next, two-dimensional wavelet transform processing in a first embodiment of the present invention using a wavelet transform processor having the above construction will be described.

In the first embodiment, the two-dimensional wavelet transform processing is realized by performing one-dimensional transform processing in 2 stages, in different directions. During the 2-stage processing, 2×2 data rotation processing is performed.

Figure 3:
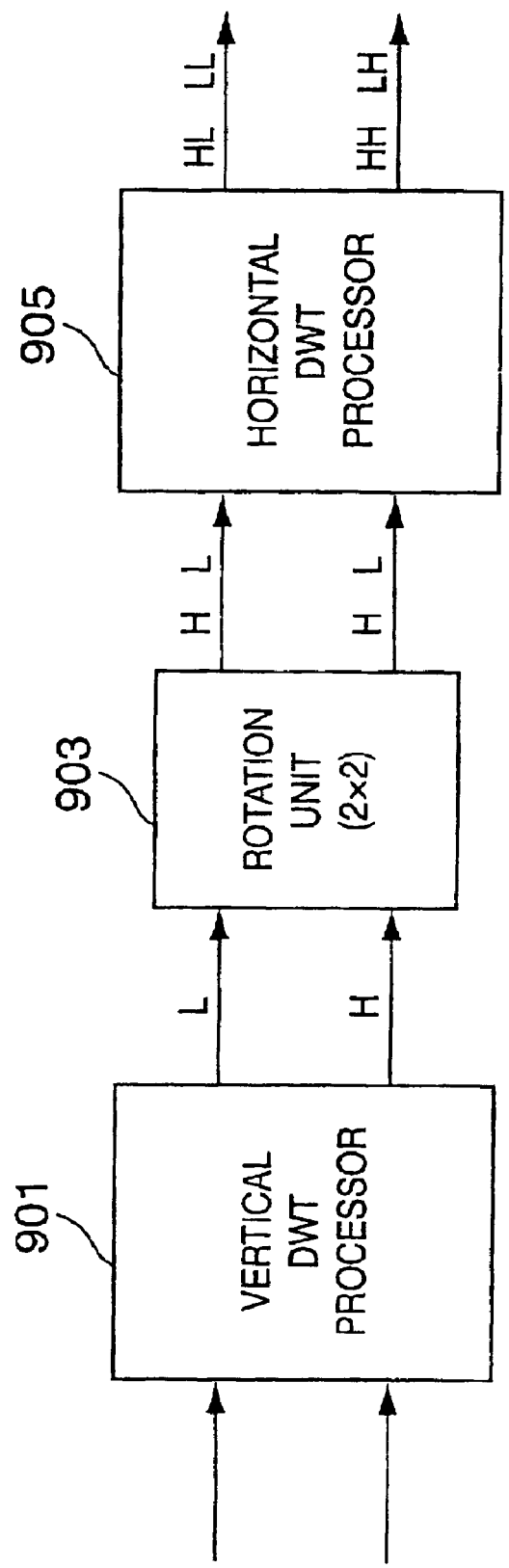
FIG. 3 is a block diagram showing the construction of a two-dimensional wavelet transform processing apparatus according to a first embodiment of the present invention.

FIG. 3 shows the construction of a two-dimensional wavelet transform processing apparatus according to the first embodiment. In the figure, numeral 901 denotes a vertical one-dimensional DWT processor (hereinbelow referred to as a "vertical DWT processor"); 903, a data rotation unit for 2×2 data rotation processing; and 905, a horizontal one-dimensional DWT processor (hereinbelow, referred to as a "horizontal DWT processor"). As shown in FIG. 2, the vertical DWT processor 901 and the horizontal DWT processor 905 respectively have a construction using the calculation unit in FIG. 1 in 4 stages. The vertical DWT processor 901 has the line memory 1901 (FIG. 19) as the buffer 621 (FIG. 1) in the respective 4 stages of calculation units, and the horizontal DWT processor 905, the 2 stages of registers 1801 and 1802 (FIG. 18) as the buffer 621 in the respective 4 stages of calculation units. The vertical DWT processor 901 and the horizontal DWT processor 905 perform vertical one-dimensional wavelet transform processing and horizontal one-dimensional wavelet transform processing.

Respective 1 pixel from each line of 2-line pixel data, i.e., data of 2 pixels arrayed in the vertical direction, are sequentially inputted into the vertical DWT processor 901 from the memory or line buffer (not shown).

The vertical DWT processor 901 outputs a vertical low-frequency transform coefficient $L_v$ and a vertical high-frequency transform coefficient $H_v$ by using the newly-received vertical 2 pixel data and pixel data in the line memory 1901 (FIG. 19) inputted at 1-line previous timing. As the line memory for storing 1 line image data is used, calculation can be performed among the 3 pixels, i.e., the 1-line previously input pixel data and the newly-received vertical 2 pixel data.

The processing by the above-described vertical DWT processor 901 will be described in detail.

Figure 20:
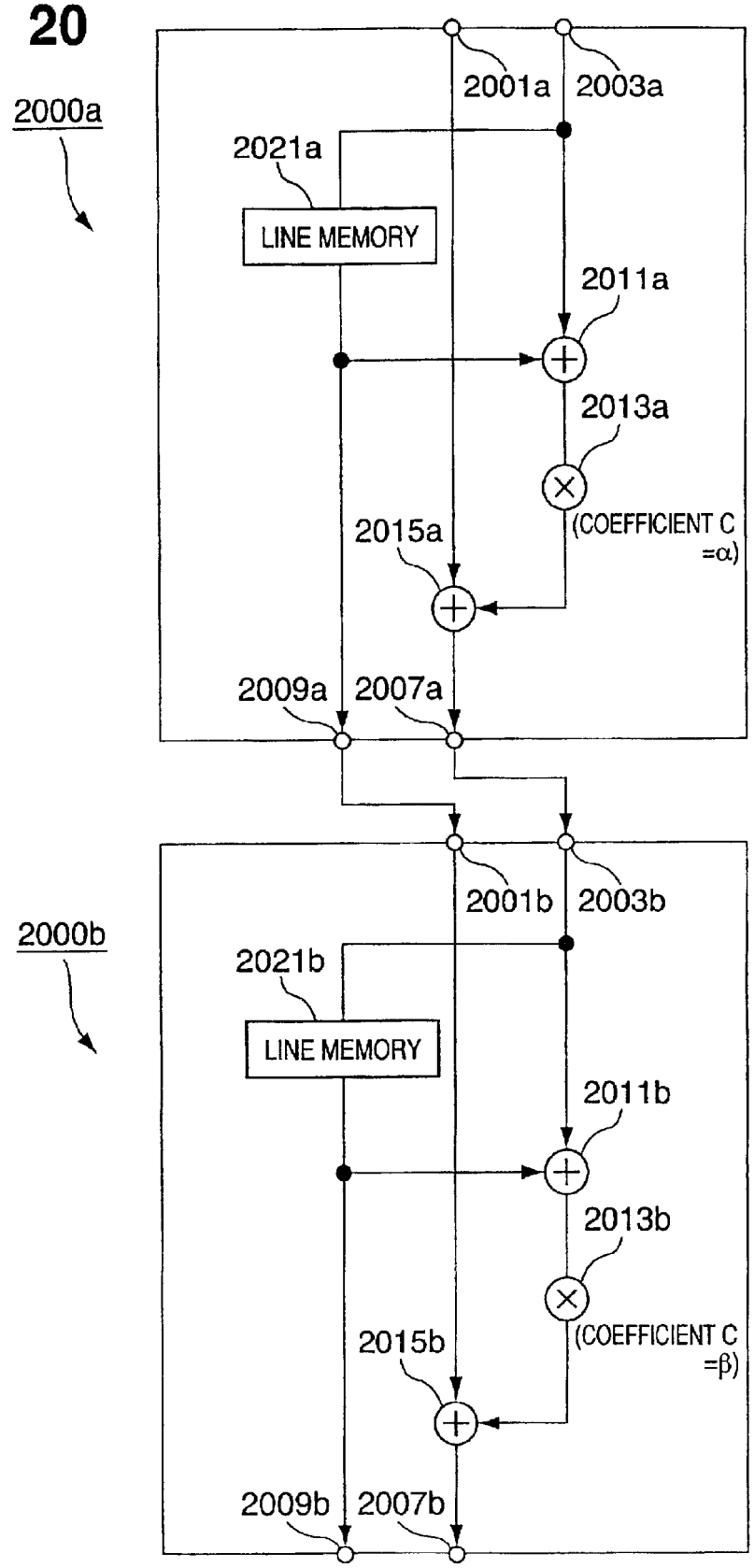
FIG. 20 is a block diagram showing 2 stages of serially-connected adjacent calculation units among 4 stages of calculation units constructing a vertical DWT processor in FIG. 3.

FIG. 20 shows 2 stages of adjacent serially-connected calculation units 2000a and 2000b among the 4 stages of calculation units constructing the vertical DWT processor 901. The figure shows an example where the calculation units 701 and 702 in FIG. 2 are connected with each other. That is, the calculation units 2000a and 2000b correspond to the calculation units 701 and 702. In the calculation units 2000a and 2000b, the multiplication coefficients C of multipliers 2013a and 2013b are α and β. Further, 2 outputs 2007a and 2009a from the calculation unit 2000a are connected to 2 inputs 2001b and 2003b of the calculation unit 2000b. Further, as described above, the buffer 621 is constructed with the line memories 2021a and 2021b. The other calculation units 703 and 704 have the same construction.

The flow of data in FIG. 20 will be described below. In the figure, subscripts of pixel data represent vertical positions of the pixel data.

Pixel data $X_{2n-1}$, from 1-line odd-numbered pixel data, is inputted from 1 input terminal 2001a of the calculation unit 2000a, into an adder 2015a. Pixel data $X_{2n}$ in vertical relation to the data $X_{2n-1}$, from 1-line even-numbered pixel data, is inputted into an adder 2011a, and at the same time, inputted into the line memory 2021a.

In the line memory 2021a, pixel data $X_{2n-2}$, in vertical relation to the input pixel, is outputted to an output terminal 2009a and the adder 2011a. The pixel data $X_{2n-2}$ is data which has been inputted into the line memory 2021a 1-line cycle before. The adder 2011a adds the data $X_{2n}$ to the data $X_{2n-2}$ and outputs the result of addition to a multiplier 2013a. Note that the data $X_{2n-2}$ has a pixel position on the image 2-line prior to the data $X_{2n}$, and in vertical relation to that of the data $X_{2n}$, is added to the data $X_{2n}$. The multiplier 2013a multiplies the result of addition by the coefficient C (=α) and outputs the result of multiplication $α(X_{2n}+X_{2n-2})$ to the adder 2015a. The adder 2015a adds the result of multiplication from the multiplier 2013a to the input $X_{2n-1}$ from the input terminal 2001a, to obtain $D_{2n-1}=X_{2n-1}+α(X_{2n}+X_{2n-2})$, and outputs the result of addition to the output terminal 2007a.

The above calculation is performed on all the pixel data for 1 line, thereby the above-described calculation to obtain the odd-numbered pixel group D corresponding to the expression (1) is performed.

In the calculation unit 2000b, the odd-numbered data group obtained in the above calculation is used as an input, and obtains the above-described even-numbered pixel group E corresponding to the expression (2). The calculation unit 2000b performs the same calculation as that of the calculation unit 2000a except that the input group 2003b is D and that the coefficient C is β, therefore, the detailed explanation of the calculation will be omitted.

In this manner, the vertical low-frequency transform coefficient and the vertical high-frequency transform coefficient can be obtained by using the 4-stage connected calculation units.

The outputted 2 transform coefficients $L_v$ and $H_v$ are inputted into the data rotation unit 903. The rotation unit 903 receives respective 2 of the low-frequency and high-frequency transform coefficients, rearrange them, and outputs the 2 low-frequency transform coefficients and then the 2 high-frequency transform coefficients. FIGS. 4A and 4B conceptually shows the input/output relation of the coefficients.

FIG. 4A shows 2 pairs of data divided in input units, and FIG. 4B, the 2 pairs of data divided in output units. If a comparison is made between the FIGS. 4A and 4B, it is understood that the data shown in FIG. 4A are rotated to the right by 90°, to the data in FIG. 4B.

As the rearranged 2 low-frequency transform coefficients and 2 high-frequency transform coefficients are respectively horizontally continuous transform coefficients, the horizontal DWT processor 905 can perform the horizontal wavelet transform processing on the data.

In the first embodiment, the data rotation unit is provided for data rearrangement, and the horizontal DWT processor 905 perform processing alternately on the rearranged 2 types of low-frequency and high-frequency transform coefficients.

In a case where the buffer 621 (FIG. 1) of the respective grid point data calculation units of the horizontal DWT processor 905 comprises 2 stages of registers 1801 and 1802 (FIG. 18), the horizontal wavelet transform processing is made by alternate on 2 types of low-frequency and high-frequency signals by alternately processing the 2 types of signals. The processing will be described in more detail.

At a current cycle, it is assumed that data necessary for calculating low-frequency transform coefficient are stored into the first-stage register 1802 of the 2-stage registers 1801 and 1802, as the buffer 621 of the respective grid point data calculation units, and data needed for calculating high-frequency transform coefficient are stored into the second-stage register 1801. At this time, the data for high-frequency transform coefficient calculation are merely connected to the subsequent register 1802 and not referred to from any of the calculation units. This state equals a state where no data for high-frequency transform coefficient calculation exists. All the calculation units are to process low-frequency transform coefficients.

Figure 4:
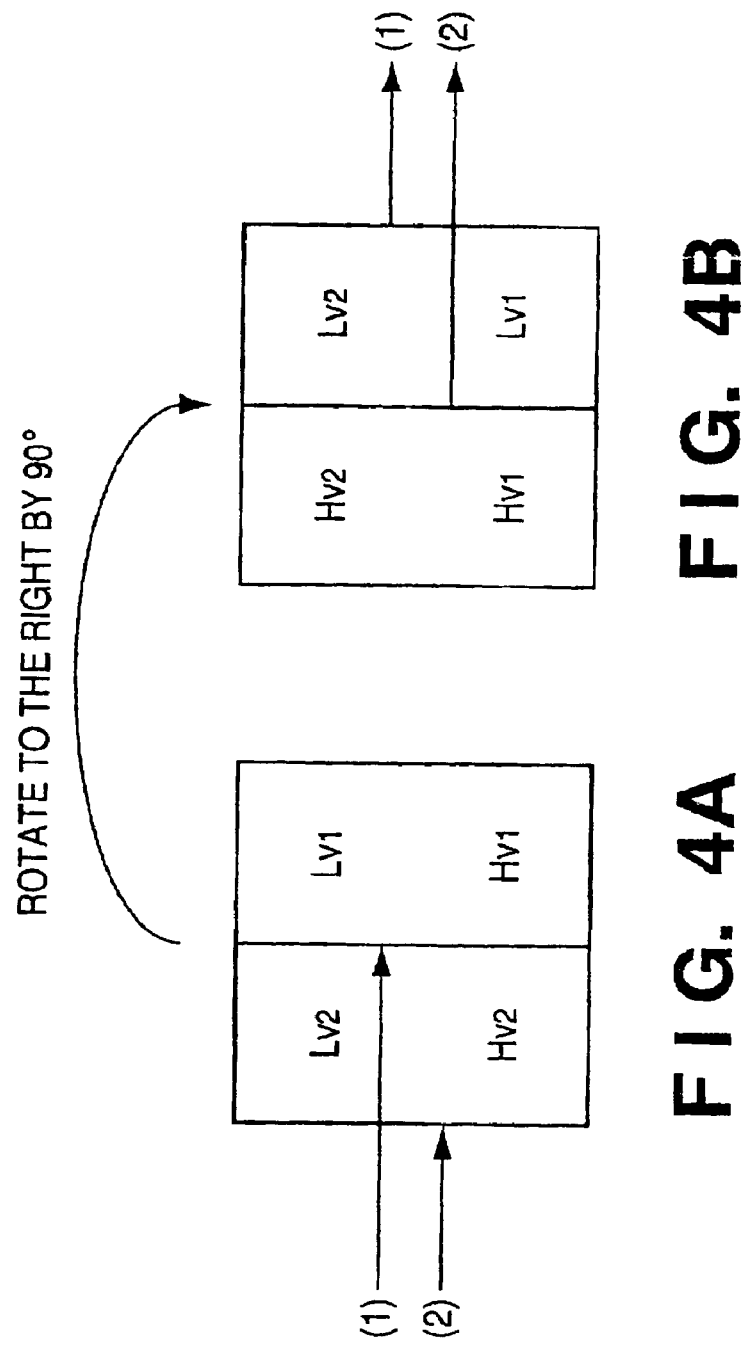
FIGS. 4A and 4B are block diagrams conceptually showing the operation of a rotation unit in FIG. 3.

Accordingly, at this cycle, the 2 low-frequency transform coefficients $L_{v1}$ and $L_{v2}$ among the transform coefficients in FIG. 4 are inputted, data outputted from the first-stage register 1802 of the 2-stage registers (data for low-frequency transform coefficients here), with the low-frequency transform coefficients, are processed, and the results of processing (LL and LH) are outputted. Then at the next cycle, the data for high-frequency transform coefficient calculation stored in the second-stage register 1801 are shifted to the first-stage register 1802, and the input $L_{v2}$ or the data used in the processing at the current cycle, inputted from the previous-stage grid point data calculation unit, is inputted into the second-stage register 1801.

At the next cycle, the order of the low-frequency transform coefficients and the high-frequency transform coefficients stored in the 2 stages of registers 1801 and 1802 is reversed, such that all the calculation units are to process the high-frequency transform coefficients. Accordingly, at the next cycle, the rotation unit 903 inputs the 2 high-frequency transform coefficients $H_{v1}$ and $H_{v2}$, processes them, and outputs the results of processing (HL and HH).

The processing of the horizontal DWT processor 905 will be described in detail.

Figure 21:
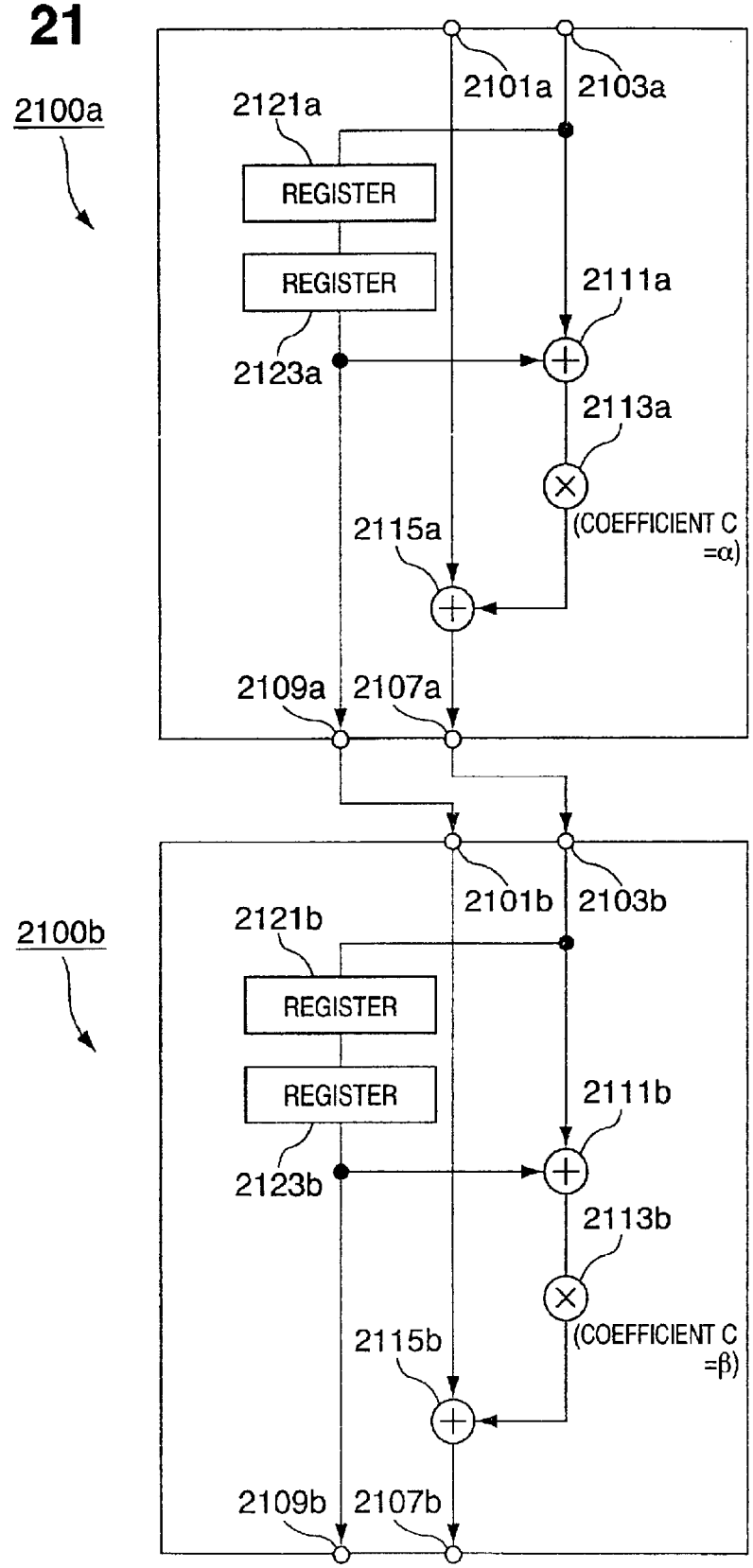
FIG. 21 is a block diagram showing 2 stages of serially-connected adjacent calculation units among 4 stages of calculation units constructing a horizontal DWT processor in FIG. 3.

FIG. 21 shows 2 stages of serially-connected adjacent calculation units 2100a and 2100b among the 4 stages of calculation units constructing the horizontal DWT processor 905. The figure shows an example where the calculation units 701 and 702 in FIG. 2 are connected with each other. That is, the calculation units 2100a and 2100b correspond to the calculation units 701 and 702. In the calculation units 2100a and 2100b, the multiplication coefficients C of multipliers 2113a and 2113b are $\alpha$ and $\beta$. Further, 2 outputs 2107a and 2109a from the calculation unit 2100a are connected to 2 inputs 2101b and 2103b of the calculation unit 2100b. Further, as described above, the buffer 621 is constructed with respectively 2 stages of registers 2121a and 2123b, and 2121b and 2123b. The other calculation units 703 and 704 have the same construction.

The flow of data in FIG. 21 will be described below. In the figure, subscripts of pixel data represent horizontal positions of the pixel data.

First, as it is apparent from the above description, a data group of alternate low-frequency transform coefficients and high-frequency transform coefficients, $L_{2m-3}$, $H_{2m-3}$, $L_{2m-1}$, $H_{2m-1}$, $L_{2m+1}$, $H_{2m+1}$, ..., outputted from the rotation unit 903, are inputted into an input terminal 2101a of the calculation unit 2100a. Similarly, a data group of alternate low-frequency transform coefficients and high-frequency transform coefficients, $L_{2m-2}$, $H_{2m-2}$, $L_{2m}$, $H_{2m}$, $L_{2m+2}$, $H_{2m+2}$, ..., are inputted into an input terminal 2103a. As timing of 2 inputs, the data $L_{2m-1}$ and $L_{2m}$, are simultaneously inputted.

Next, description will be made about a case where the low-frequency transform coefficient $L_{2m-1}$ is inputted from the input terminal 2101a into an adder 2115a, and at the same time, the low-frequency transform coefficient $L_{2m}$ is inputted from the input terminal 2103a into adder 2111a and register 2121a.

When the low-frequency transform coefficients $L_{2m-1}$ and $L_{2m}$ are inputted, the high-frequency transform coefficient $H_{2m-2}$ inputted from the input terminal 2103a at 1-cycle previous timing is stored in the register 2121a. Further, the low-frequency transform coefficient $L_{2m-2}$ inputted from the input terminal 2103a 2-cycle previous timing is stored in the register 2123a then.

Accordingly, the adder 2111a adds the low-frequency transform coefficient $L_{2m}$ inputted from the input terminal 2103a to the low-frequency transform coefficient $L_{2m-2}$ stored in the register 2123a, and outputs the result of addition to the multiplier 2113a.

The multiplier 2113a multiplies the result of addition by the coefficient C ($=\alpha$), and outputs the result of multiplication $\alpha(L_{2m}+L_{2m-2})$ to the adder 2115a. The adder 2115a adds the result of multiplication from the multiplier 2113a to the input $L_{2m-1}$ from the input terminal 2101a, to obtain $DL_{2m-1}=L_{2m-1}+\alpha(L_{2m}+L_{2m-2})$ of the low-frequency transform coefficient group, and outputs it to the output terminal 2107a. The output value $L_{2m-2}$ from the register 2123a is outputted to the other output terminal 2109a.

At the next timing, the high-frequency transform coefficients $H_{2m-1}$ and $H_{2m}$ are inputted into the input terminal 2101a and 2101b. At the same time, the respective data are shifted to the 2 stages of registers 2121a and 2123b, i.e., $L_{2m}$ is stored into the register 2121a and $H_{2m-2}$ is stored into the register 2123a. Accordingly, the result of addition by the adder 2115a at this timing is $DH_{2m-1}=H_{2m-1}+\alpha(H_{2m}+H_{2m-2})$ of the high-frequency transform coefficient group, and it is outputted to the output terminal 2107a. $H_{2m-2}$ is outputted to the other output terminal 2109a.

The above calculation is performed on all the pixel data for 1 line, thereby the low-frequency and high-frequency transform coefficients of the pixel transform data group D corresponding to the above-described expression (1) are alternately obtained.

The calculation unit 2100b uses the pixel group obtained as above as an input, and alternately obtains low-frequency transform coefficients and high-frequency transform coefficients of pixel group $EL_{2m-2}=L_{2m-2}+\beta(DL_{2m-3}+DL_{2m-1})$ or $EH_{2m-2}=H_{2m-2}+\beta(DH_{2m-3}+DH_{2m-1})$. The calculation in the calculation unit 2100b is the same as that of the calculation unit 2100a except that the input group 2103b is D and that the coefficient C is $\beta$, therefore, the detailed explanation of the calculation will be omitted.

The above processing is repeated, the horizontal wavelet transform processing is performed on the 2 types of low-frequency and high-frequency signals, using the 4-stages of calculation units, thereby the transform coefficients LL, LH, HL and HH are obtained.

As described above, according to the first embodiment, as the rotation unit is provided, the two-dimensional wavelet transform processing can be performed by 1 vertical one-dimensional wavelet transform processor and 1 horizontal one-dimensional wavelet transform processor.

<Second Embodiment>

Figure 5:
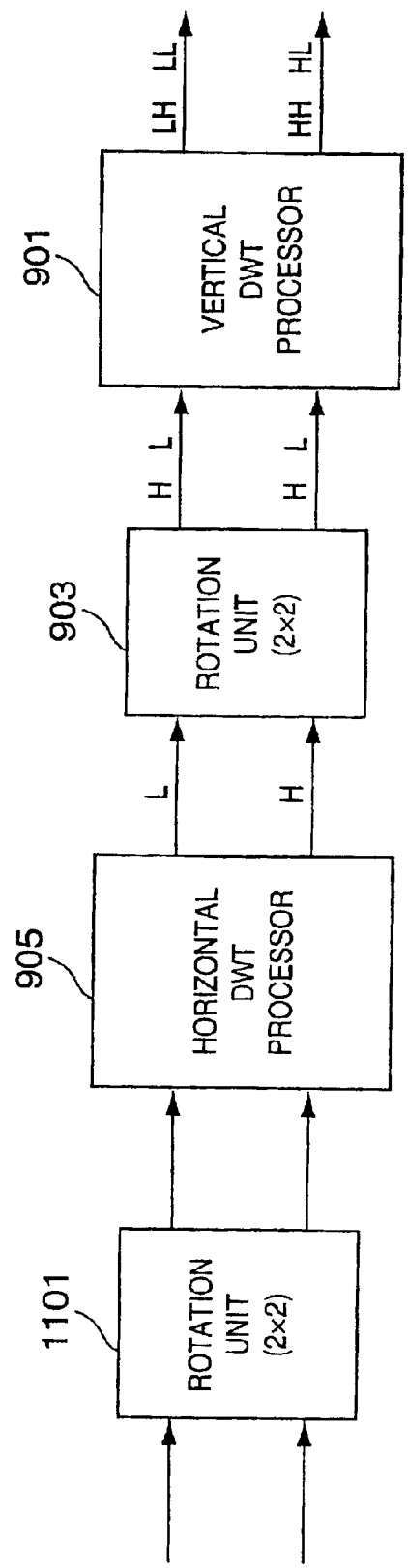
FIG. 5 is a block diagram showing the construction of the two-dimensional wavelet transform processing apparatus according to a second embodiment of the present invention.

In the second embodiment of the present invention, the order of the horizontal wavelet transform processing and the vertical wavelet transform processing is reversed. As shown in FIG. 5, the vertical DWT processor 901 is provided on the output side of the horizontal DWT processor 905, and a new rotation unit 1101 is provided in front of the horizontal DWT processor 905.

The order of pixel data inputted from the memory or line buffer (not shown) is the same as that of the above-described first embodiment. That is, respective 1 pixel from each line of 2-line pixel data, i.e., 2 pixel data arrayed in the vertical direction are inputted in parallel into the rotation unit 1101.

Figures 6A, 6B:
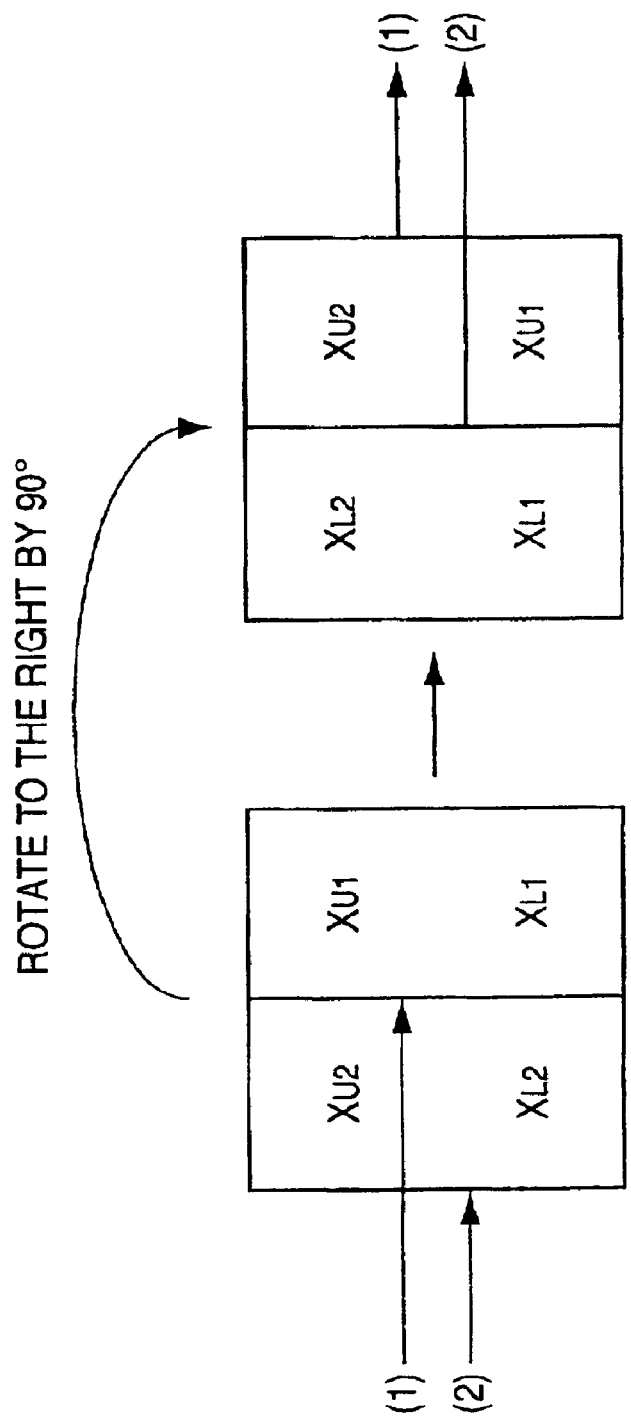
FIGS. 6A and 6B are block diagrams conceptually showing the operation of the rotation unit in FIG. 5.

The rotation unit 1101 rearranges the parallel 2-line data into alternate-line 2 pixel data and outputs the data. This processing is the same as the rotation of data by 90°. FIGS. 6A and 6B conceptually show the input/output relation of the rotation unit 1101. In FIG. 6A, a subscript U represents the upper 1 of 2 lines (upper line); a subscript L, the lower 1 of 2 lines (lower line); subscripts 1 and 2, the order of pixel. As the input pixel data are rotated to the right by 90° as shown in FIG. 6A, image data for 2 pixels of the same line are alternately outputted.

The data for 2 pixels alternately outputted by each line, are inputted into the horizontal DWT processor 905, and subjected to the horizontal wavelet transform processing corresponding to the respective input data. As the 2 line data are alternately inputted, the 2 types of signals are alternately wavelet-transformed. As described in the first embodiment, the buffer 621 (FIGS. 6A and 6B) of the respective grid point data calculation units in the horizontal DWT processor 905 has 2 stages of registers.

The transform coefficients, obtained from the horizontal wavelet transform processing and alternately outputted, are low-frequency and high-frequency transform coefficients of a line and low-frequency and high-frequency transform coefficients of the next line. These coefficients are further inputted into the rotation unit 903 and rearranged as shown in FIG. 4.

As a result, 2 low-frequency transform coefficients and 2 high-frequency transform coefficients, from 2 lines, are alternately outputted from the rotation unit 903.

As the respectively 2 transform coefficients are arrayed in the vertical direction, the 2 transform coefficients are inputted into the vertical DWT processor 901, then the vertical wavelet transform processing can be performed using the input 2 transform coefficients and data stored in the internal buffer 621.

Note that the respective grid point data calculation units of the vertical DWT processor 901 have a line memory as the buffer 621 for holding transform coefficients for 2 lines. That is, low-frequency transform coefficients for 1 line are held and high-frequency transform coefficients for 1 line are held. As the number of 1-line frequency transform coefficients is the half of the initial line data, the line memory may have a capacity for 1 line. The line memory holds low-frequency transform coefficients and high-frequency transform coefficients alternately, for processing on the low-frequency coefficients and the high-frequency coefficients alternately.

As described above, according to the second embodiment, the same advantages as those of the first embodiment can be obtained.

Note that if the order of pixel data inputted from the memory or line buffer (not shown) into the wavelet transform processor is changed such that 2 pixel data are inputted by alternate lines, the initial rotation unit 1101 can be omitted.

<Third Embodiment>

In the first and second embodiments, the horizontal DWT processor 905 has the construction shown in FIG. 2, however, the processor may have a construction used in a general FIR filter. In this case, low-frequency transform coefficients and high-frequency transform coefficients are calculated by different calculation units.

In this embodiment, the wavelet transform filter has a linear phase, i.e., wavelet transform filter coefficients are symmetrical.

Figure 7:
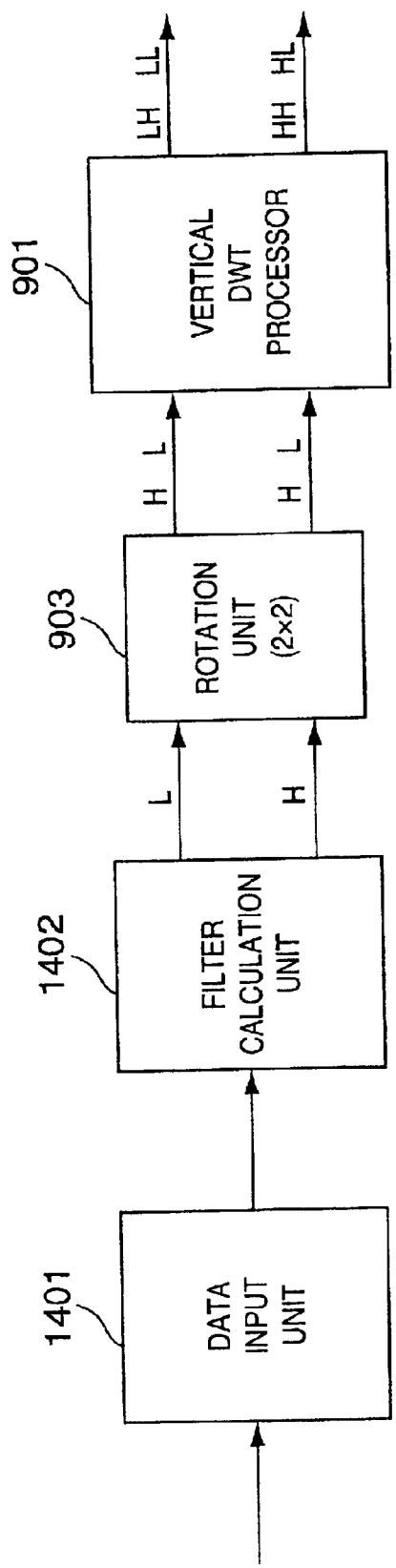
FIG. 7 is a block diagram showing the construction of the two-dimensional wavelet transform processing apparatus according to a third embodiment of the present invention.

FIG. 7 shows the construction of the two-dimensional wavelet transform processing apparatus according to the third embodiment. In the construction of FIG. 7, constituent elements are the same as those described in the second embodiment with reference to FIG. 5 except a data input unit 1401 having a construction as shown in FIG. 9 and a filter calculation unit 1402 having a construction as shown in FIG. 8.

Figure 8:
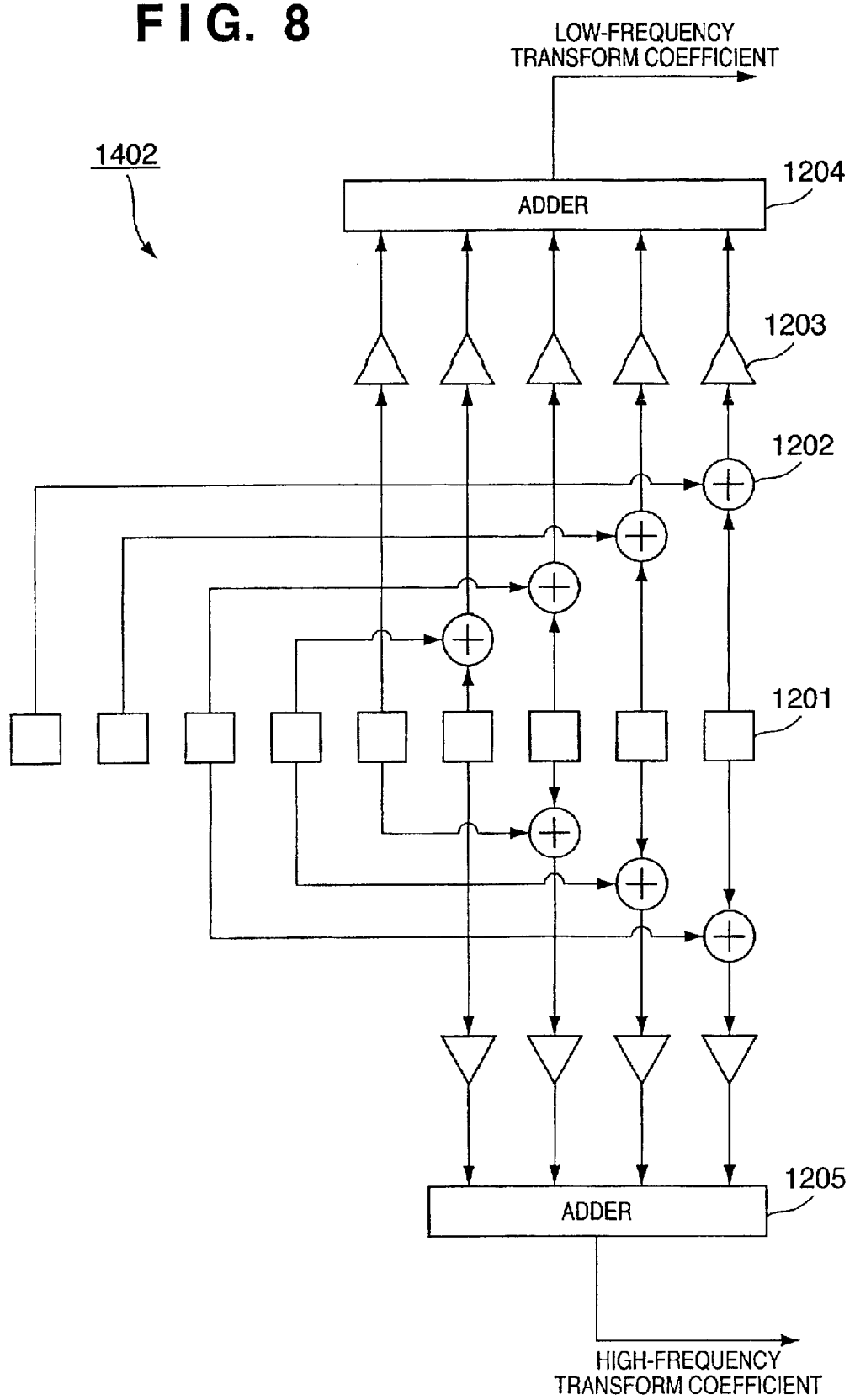
FIG. 8 is a block diagram showing the construction of an FIR filter calculation unit in FIG. 7.
Figure 9:
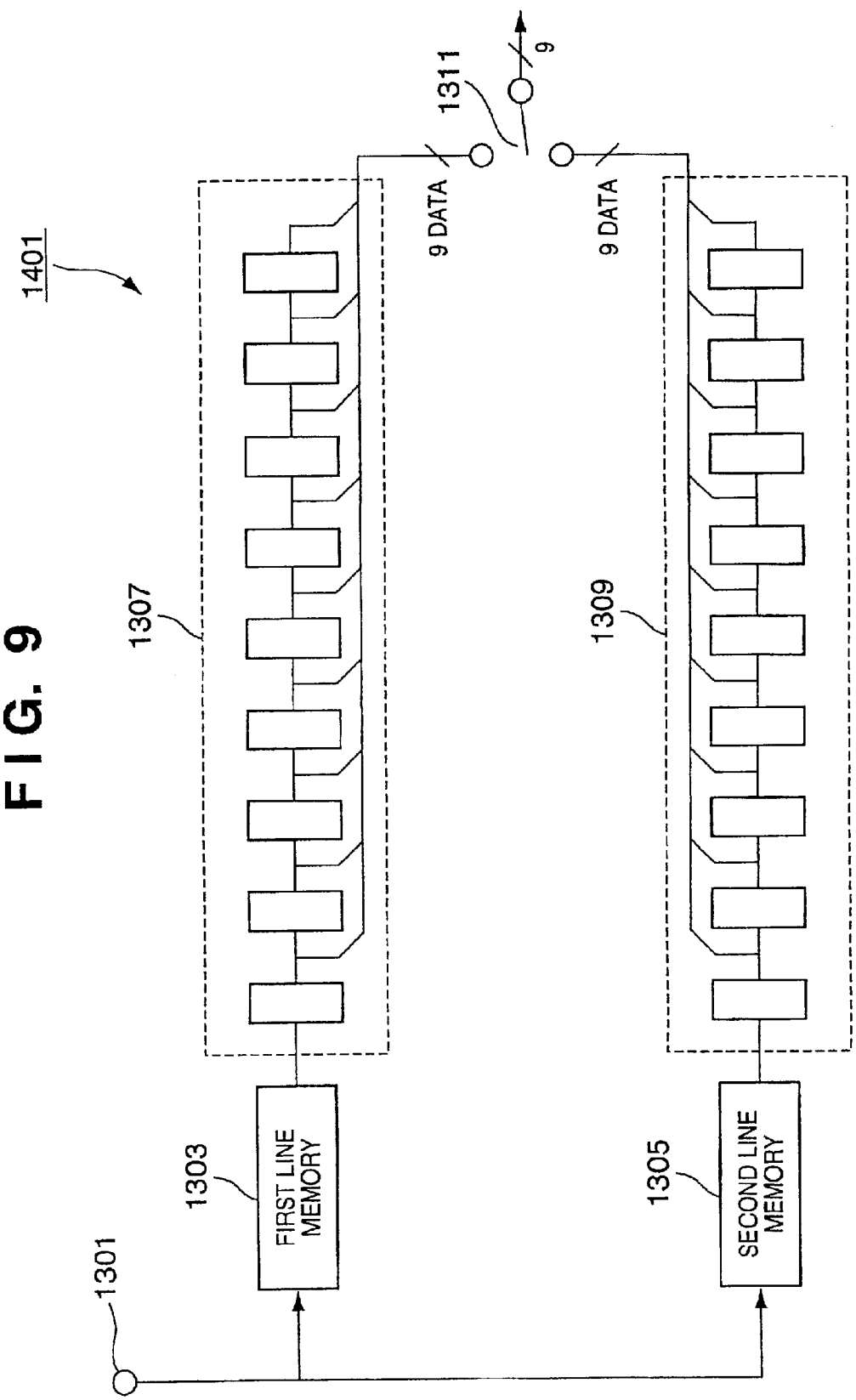
FIG. 9 is a block diagram showing the construction of a data input unit in FIG. 7.

FIG. 8 schematically shows the construction of the filter calculation unit 1402. In the figure, numeral 1201 denotes a filter input data; 1202, an adder for adding up 2 input data having the same filter multiplication coefficient; 1203, a coefficient multiplier; 1204 and 1205, adders for adding up the results of multiplication.

Next, the construction of the entire wavelet transform processor upon execution of horizontal wavelet transform processing using the filter calculation unit 1402 shown in FIG. 8 will be described.

The filter calculation unit 1402 must input pixel data corresponding to the number of filter taps, however, different from the construction in FIG. 1, as the filter calculation unit 1402 does not have a buffer inside the transform processor, it can input pixel data regardless of writing/reading to/from buffer. That is, even if transform processing is alternately performed on plural types of data, the internal state of the filter calculation unit 1402 is not taken into consideration.

To alternately perform transform processing on plural types of data, all the input pixel data must be simultaneously selected. For example, if the number of filter taps to obtain transform coefficients is 9, 9 data must be simultaneously selected. As it is inefficient to directly receive such large number of data from the memory, a new data input unit 1401 is required in correspondence with data supply to the filter calculation unit 1402.

Generally, pixel data obtained by a CCD, a scanner or the like is generated in the raster scan order, it is assumed in the following description that pixel data generated in the raster scan order is received and processed. The data input unit 1401 shown in FIG. 9 handles pixel data generated in the raster scan order. In the figure, numeral 1301 denotes a terminal for inputting the raster-scan order pixel data; 1303, a first line memory having a capacity for 1 line; 1305, a second line memory having a capacity for ½ line; 1307 and 1309, shift registers where 9 registers are connected; and 1311, a selector for selecting 2 groups of 9 pixel data.

Hereinbelow, the particular operation of the data input unit 1401 will be described.

First, pixel data of the first line, inputted from the input terminal 1301 of the data input unit 1401 shown in FIG. 7, are stored into the first line memory 1303. Considering the input on the basis of processing cycle (period) of the wavelet transform processor which is a significant constituent element of the present invention, as the entire processing balance becomes best if 2 pixel data are inputted during 1 cycle, pixel data are inputted at such rate in the present embodiment.

Next, pixel data of the second line are stored into the second line memory 1305 while data are read by 1 pixel per 1 cycle from the first line memory 1303 and the second line memory 1305. The data are sent to the shift registers 1307 and 1309. It is convenient to delay the reading from the second line memory 1305 by 1 cycle rather than to simultaneously start data reading from the line memories 1303 and 1305.

At 1 cycle, 2 pixel data are held and 1 pixel data is outputted from the second line memory 1305. Upon completion of storage of all the pixel data of the second line, merely the half of the data remains. Accordingly, the second line memory 1305 has the capacity for storing data for ½ line.

The pixel data inputted into the shift registers 1307 and 1309 are alternately selected by the selector 1311 by each 1 cycle, and processed by the filter calculation unit 1402 shown in FIG. 8. The phase of pixel data in the shift register 1309 is delayed by 1 cycle from that of the shift register 1307. However, there is 1-cycle shift in selection timing of the selector 1311 to select the 2 shift registers 1307 and 1309, therefore, the 1-cycle delay is cancelled, and selector outputs have the same phase. The filter calculation unit 1402 calculates and outputs low-frequency and high-frequency wavelet transform coefficients based on the same phase 9 data for 2 lines.

As the output timing of transform coefficients is the same as that of the second embodiment, the rotation unit 903 rearranges the transform coefficients, then the vertical DWT processor 901 performs transform processing, and transform coefficients by the two-dimensional wavelet transform processing can be obtained at the same timing as that of the second embodiment.

<Fourth Embodiment>

In this embodiment, the 2 line memories used on the input side of the filter calculation unit 1402 in the third embodiment are provided on the output side of the filter calculation unit 1402. Note that the total capacity of the line memory is the same as that of the third embodiment, however, 3 line memories respectively having a capacity for ½ line are used.

As the horizontal wavelet transform processing is appropriate to raster-scan order pixel data, the pixel data can be directly inputted into the horizontal DWT processor and processed there. Note that the horizontal DWT processor may be the filter calculation unit having the construction in FIG. 8 or the transform processor having the construction in FIG. 2.

Figure 10:
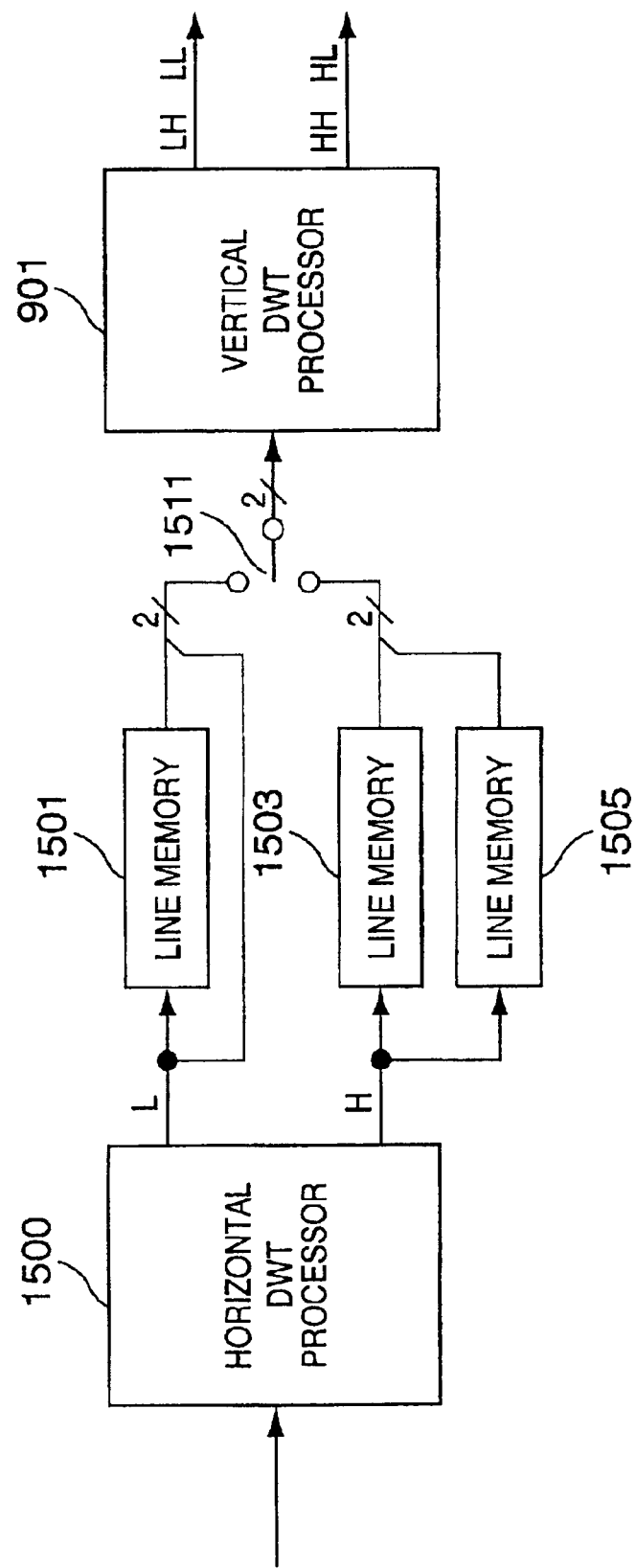
FIG. 10 is a block diagram showing the construction of the two-dimensional wavelet transform processing apparatus according to a fourth embodiment of the present invention.

FIG. 10 is a block diagram showing the construction of the wavelet transform processing apparatus according to a fourth embodiment. In the construction of FIG. 10, raster-scan order pixel data are received, and immediately subjected to the horizontal wavelet transform processing by a horizontal DWT processor 1500. As in the case of the third embodiment, 2 pixel data per 1 cycle are inputted.

Low-frequency and high-frequency transform coefficients as the results of processing by the horizontal DWT processor 1500 on 2n-th line data are respectively stored into line memories 1501 and 1503. Further, among the results of processing on (2n+1)-th line data, high-frequency transform coefficients are stored into a line memory 1505, while low-frequency transform coefficients are immediately sent via a selector 1511 to the vertical DWT processor 901. In synchronization with this operation, 1-line previous low-frequency transform coefficients are read from the line memory 1501, and sent, with one of 2 coefficients of low-frequency transform coefficients arrayed in the vertical direction, to the vertical DWT processor 901.

The vertical DWT processor 901 can continuously perform transform processing on the horizontal low-frequency transform coefficients. During the processing, the (2n+1)-th line horizontal high-frequency transform coefficients are stored into the line memory 1505.

When the (2n+1)-th line pixel data have been inputted, as the processing on the (2n)-th and (2n+1)-th line low-frequency transform coefficients has been completed, the stored high-frequency transform coefficients for 2 lines are read from the line memories 1503 and 1505, then sent via the selector 1511 to the vertical DWT processor 901, and subjected to the transform processing there.

As in the case of the low-frequency transform coefficients processed in synchronization with the input of the (2n+1)-th pixel data, the high-frequency transform coefficients are processed in synchronization with the input of (2n+2)-th line pixel data. The (2n+n)-th line pixel data, inputted during the processing on the high-frequency transform coefficients, are subjected to the horizontal wavelet transform processing, and the results of processing are stored in the same storage for the (2n)-th line data. In the line memory 1503 holding the high-frequency transform coefficients, as the amount of output data and that of input data are the same, the amount of held data does not change. In the memory, the old data are updated with newly-stored data.

As described above, the transform coefficients by two-dimensional wavelet transform can be obtained. The output order of the transform coefficients is different from that of the above-described embodiments. Different from the above-described embodiments where the low-frequency and high-frequency transform coefficients for 2 line image data are outputted by alternate lines upon each processing upon each pixel data, the horizontal DWT processor 1500 outputs low-frequency and high-frequency transform coefficients for 1 line. In this manner, as the line buffer is provided for temporarily storing the low-frequency and high-frequency transform coefficients outputted in line units, the two-dimensional wavelet transform processing can be performed by 1 vertical one-dimensional wavelet transform processor and 1 horizontal one-dimensional wavelet transform processor. Thus the hardware construction can be reduced.

<Fifth Embodiment>

The above-described first to fourth embodiments are based on the premise that 2 pixel data are inputted at 1 cycle of transform processing, however, in the fifth embodiment, the wavelet transform processing apparatus has a construction to input data 1 pixel per 1 cycle of transform processing.

If the amount of input data per 1 cycle of transform processing is reduced, the respective transform processors operate at 50% availability, and the hardware resource cannot be efficiently utilized.

In the fifth embodiment, as 1 transform processor performs both of vertical wavelet transform processing and horizontal wavelet transform processing, the transform processor operates at 100% availability. Thus the hardware can be effectively utilized.

Figure 11:
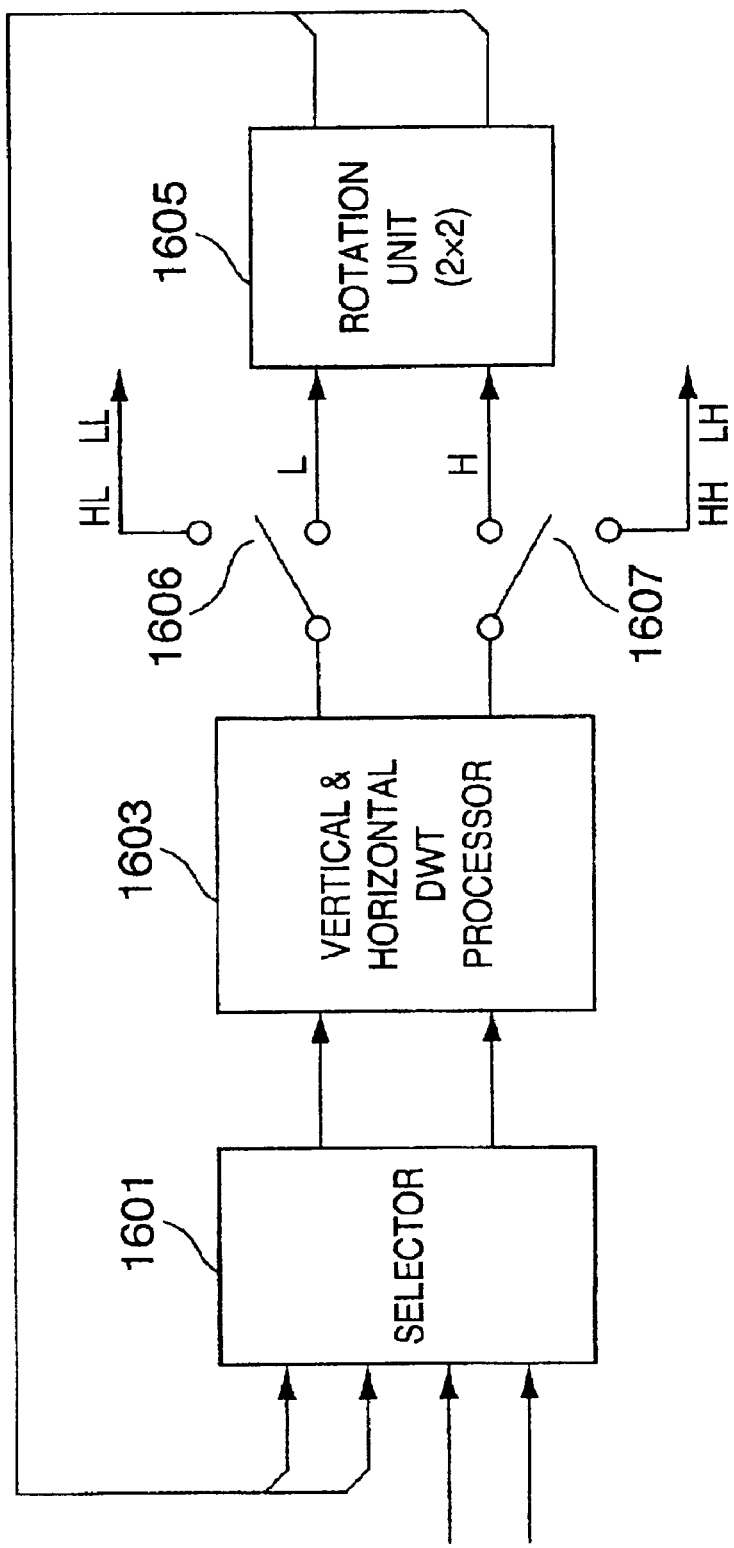
FIG. 11 is a block diagram showing the construction of the two-dimensional wavelet transform processing apparatus according to a fifth embodiment of the present invention.
Figure 12:
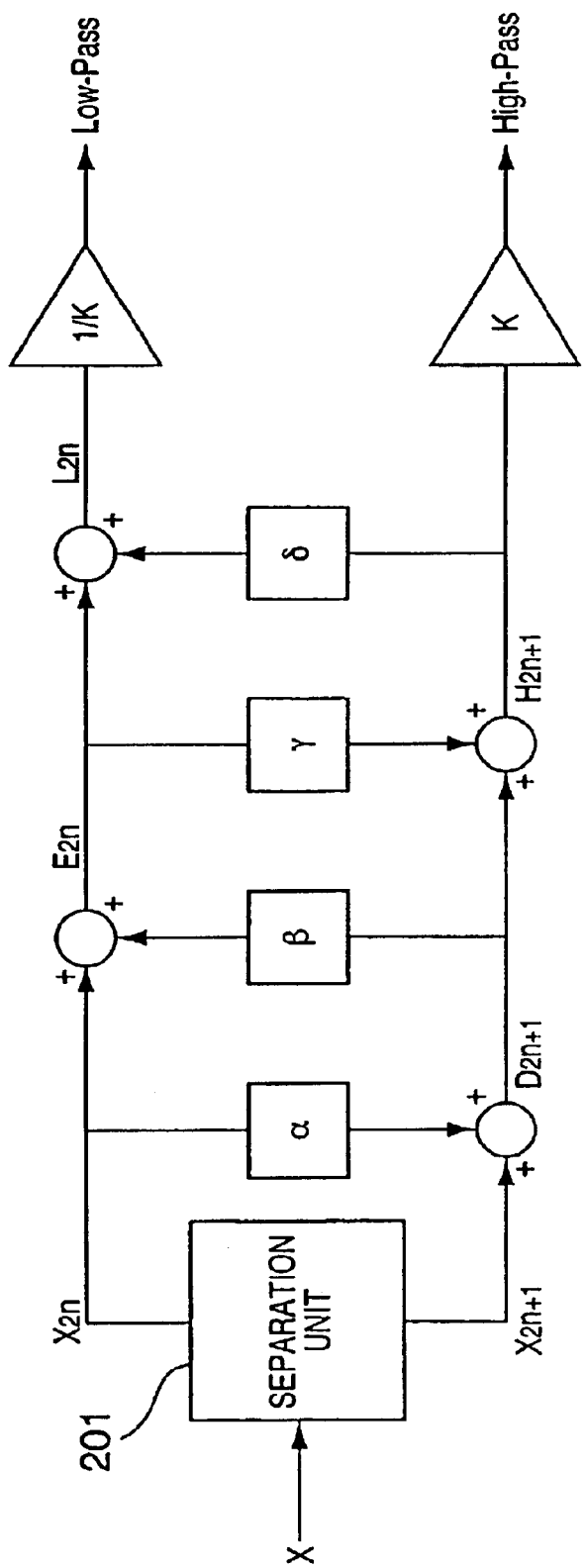
FIG. 12 is a block diagram showing the conventional construction for realizing 9×7 filter processing by the lifting calculation.
Figure 13:
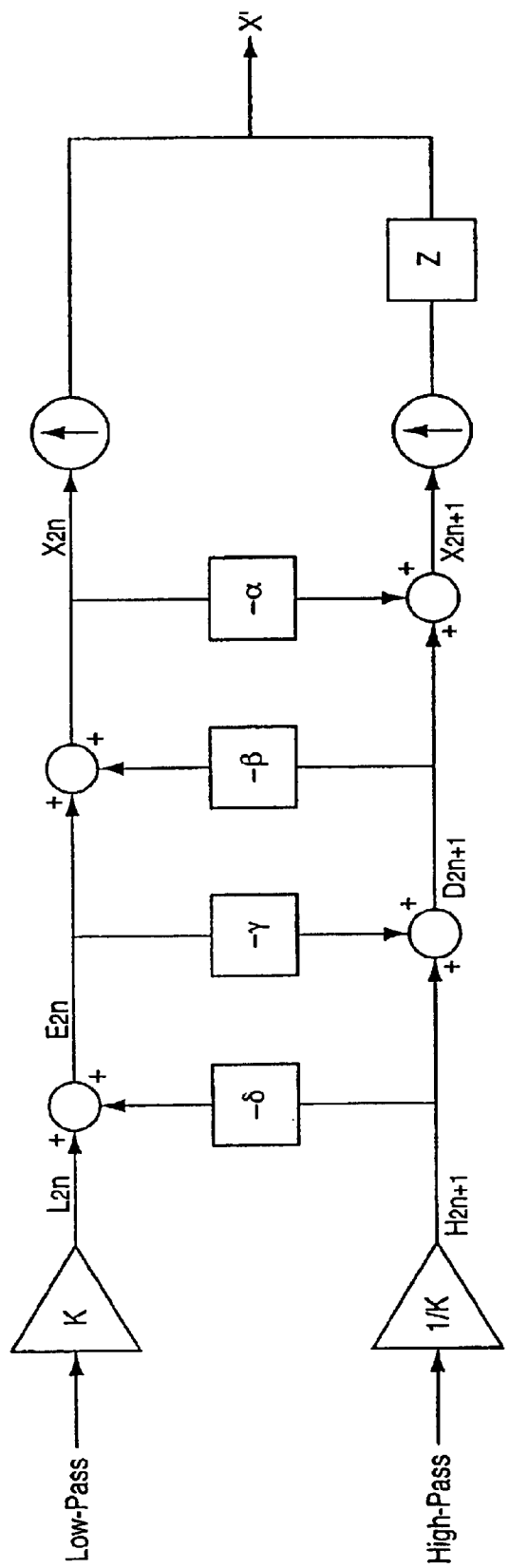
FIG. 13 is a block diagram showing the conventional construction for realizing inverse 9×7 filter processing by the lifting calculation.

FIG. 11 shows the construction of the fifth embodiment. In the figure, numeral 1601 denotes a selector for selecting 1 group of 2-input 2 group data; 1603, a horizontal & vertical DWT processor; and 1605, a data rotation unit for rotating 2×2 data.

As in the case of the above-described first embodiment, respective 1 pixel from each line of 2-line data i.e. vertical 2 pixels are inputted via the selector 1601 into the DWT processor 1603.

The DWT processor 1603 processes the input data in a vertical transform mode.

Note that only 4 pixel data are continuously inputted at 2 cycles, then at the next 2 cycles, data input is stopped. As 4 pixel data are inputted at total 4 cycles, the input equals the input of 1 pixel per 1 cycle.

The transform processor 1603 processes the 4 pixel data inputted in the 2-cycle period, then outputs 2 pairs of vertical low-frequency transform coefficients and high-frequency transform coefficients. The transform coefficients are passed through switches 1606 and 1607, and rearranged by the rotation unit 1605 as in the case of the above-described first embodiment. Then 2 low-frequency transform coefficients and 2 high-frequency transform coefficients are sequentially inputted into the selector 1601.

During the 2-cycle period in which the data input is stopped, the transform coefficients rearranged by the rotation unit 1605 are selected by the selector 1601, and sent to the vertical & horizontal DWT processor 1603. The vertical & horizontal transform processor 1603 performs horizontal wavelet transform processing on the 2 pairs of coefficients continuously inputted at 2 cycles, in a horizontal transform mode, and outputs the coefficients via the switches 1606 and 1607.

Note that the vertical & horizontal DWT processor 1603 basically has the construction shown in FIG. 2, however, the buffer in the respective calculation units has a line memory corresponding to the vertical transform and 2 stages of registers corresponding to the horizontal transform. The line memory and the registers are selected in accordance with transform mode, thereby the above-described operation is realized.

Further, if it is arranged such that horizontal 2 pixels of 2 line data are alternately inputted, the input data are processed in the horizontal transform mode, rearranged by the rotation unit, and then processed in the vertical transform mode, the same result can be obtained.

In the first to fifth embodiments, the forward wavelet transform processing has been described. In the inverse wavelet transform processing, except that a different multiplication coefficient is used, and a part of addition operation are changed to subtraction, the constituent elements in FIG. 2 and the higher-order construction are the same as those in the forward wavelet transform processing. Accordingly, the present invention is also applicable to inverse wavelet transform processing.

As described above, the above-described first to fifth embodiments realize a the two-dimensional wavelet transform processing apparatus, utilizing the hardware resource more effectively, with reduced hardware construction.

<Sixth Embodiment>

Hereinbelow, a sixth embodiment of the present invention will be described in detail.

First, the assumption of the present embodiment will be described.

Figure 22:
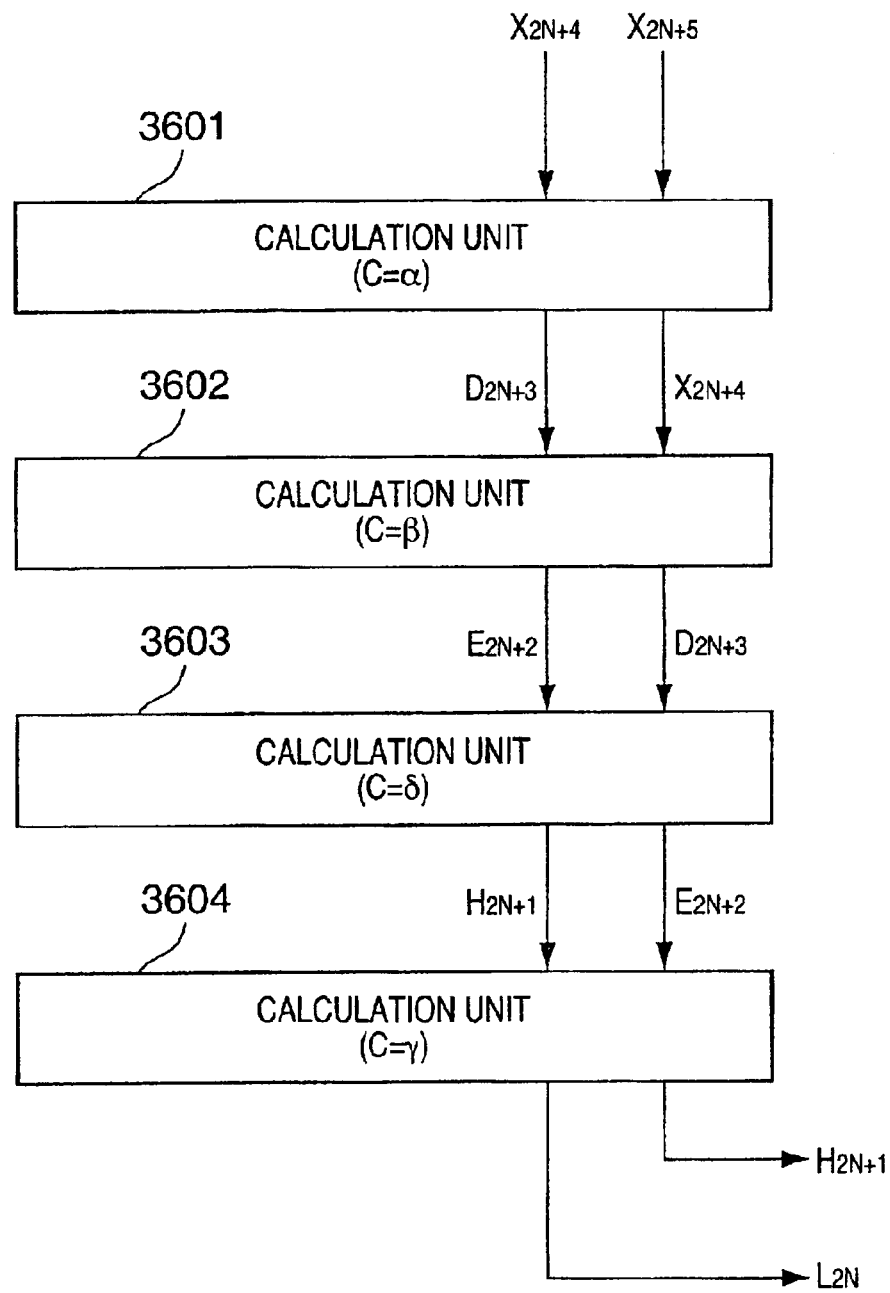
FIG. 22 is a block diagram showing the construction of a one-dimensional wavelet transform processor.
Figure 23:
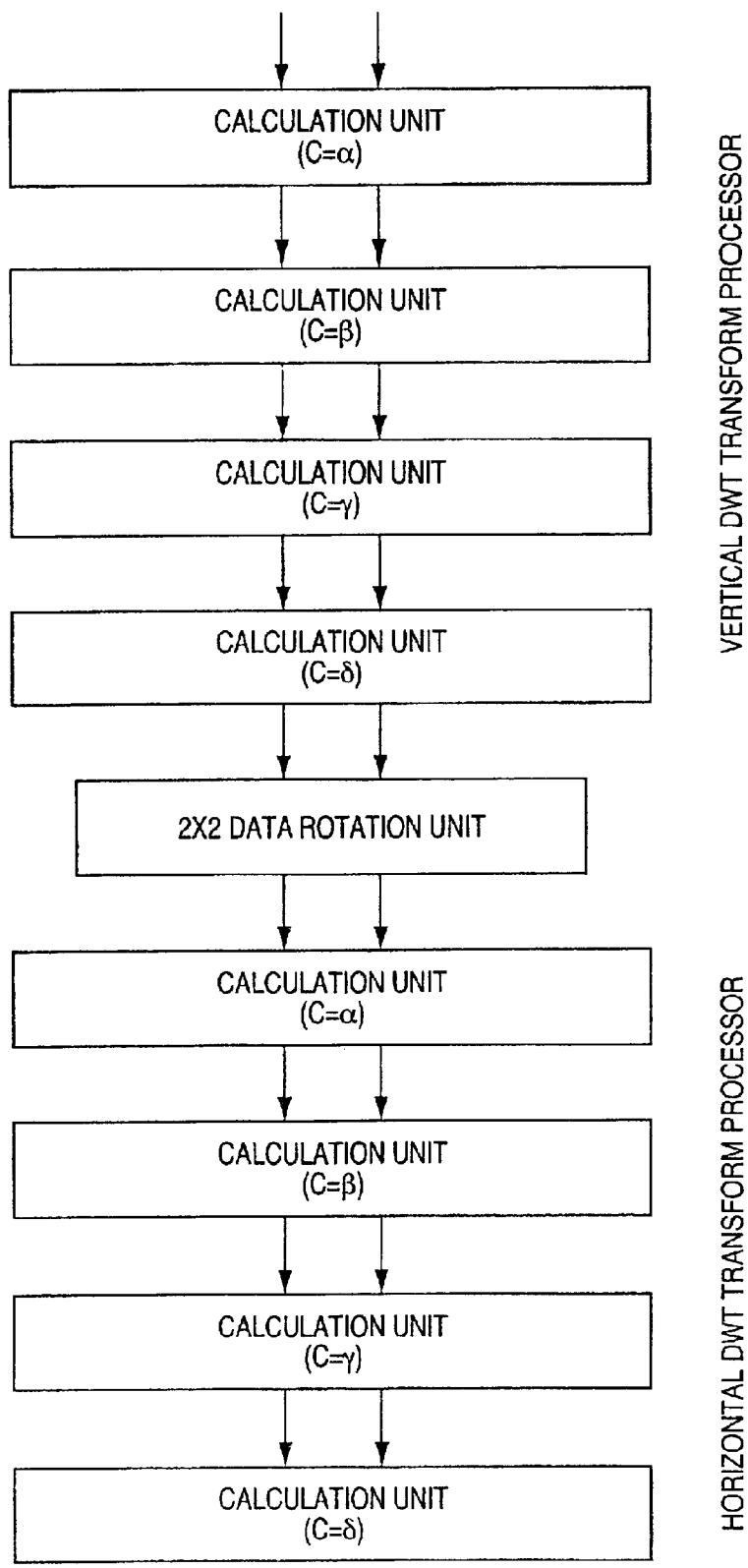
FIG. 23 is a block diagram showing the construction of a two-dimensional wavelet transform processor.

FIG. 22 shows the construction of the wavelet transform processor for performing the wavelet transform represented by the above-described lifting grid structure by a structure of plural serially-connected calculation units. As shown in FIG. 23, 2 pairs of wavelet transform processors each having this construction are used, and a 2×2 data rotation unit is provided therebetween, thereby the vertical and horizontal two-dimensional wavelet transform processings are performed.

Figure 24:
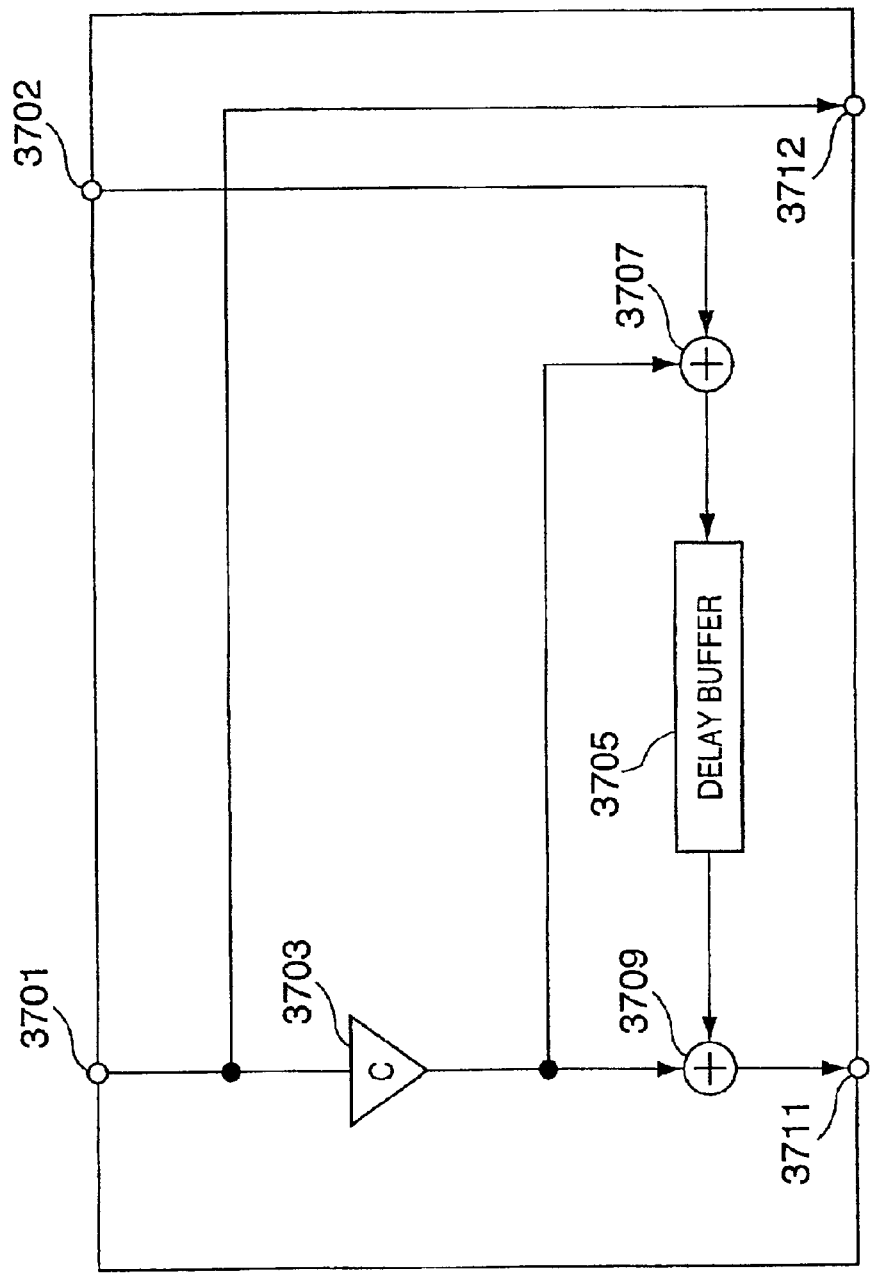
FIG. 24 is a block diagram showing the construction of the calculation unit.
Figure 29:
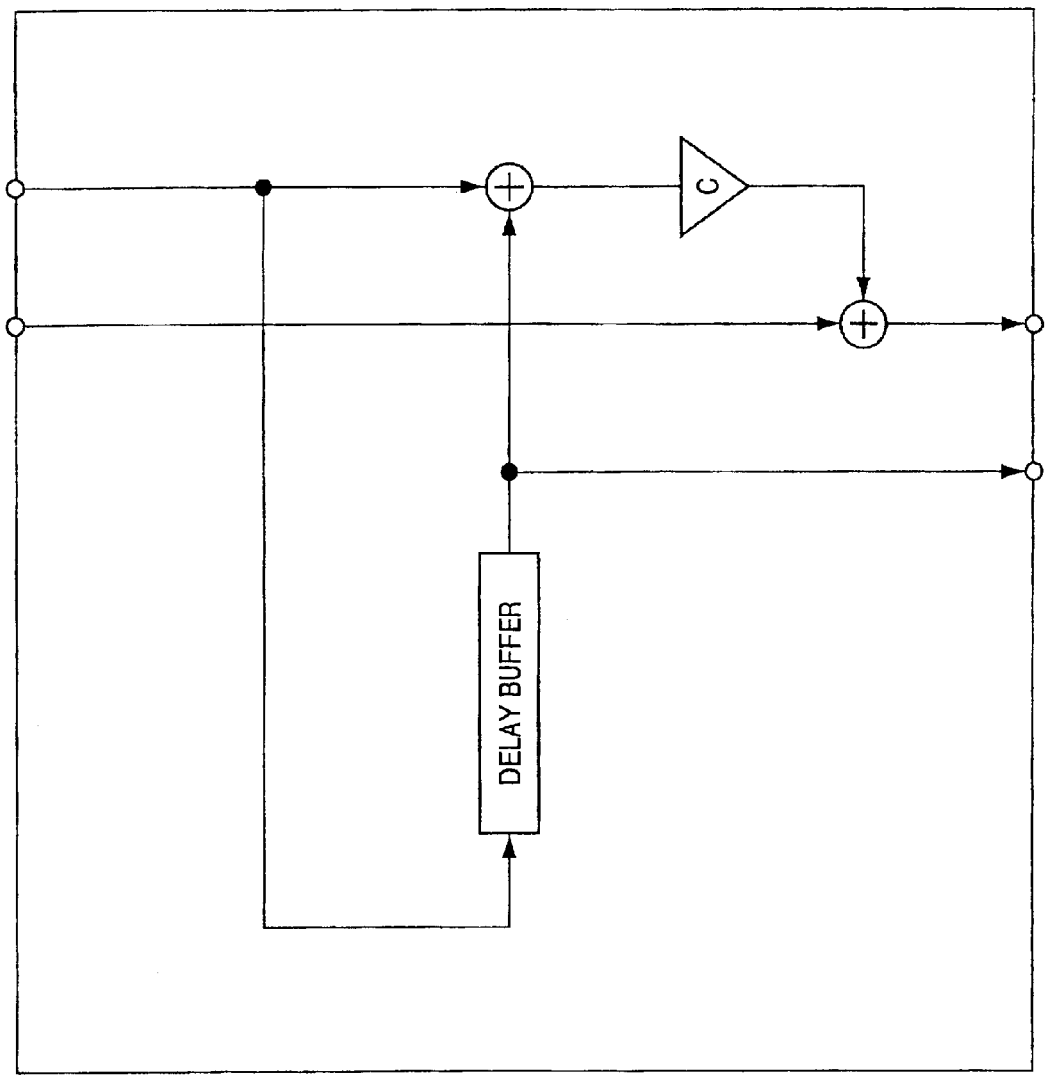
FIG. 29 is a block diagram showing the construction of a grid point data calculation unit.

The respective calculation units have 2 constructions as shown in FIGS. 24 and 29. Hereinbelow, the contents of calculation of the wavelet transform processing by the construction in FIG. 24 will be described. Note that in FIG. 24, numeral 3703 denotes a multiplier for multiplying input data by a multiplication coefficient; and 3707 and 3709, adders for inputting 2 inputs.

In FIG. 14, as in-calculation data is held, respective 1 of low-frequency transform coefficient and high-frequency transform coefficient are outputted by inputting 2 pixels at each cycle.

Assuming that data "D7t, E6t, H5t and L4t" are currently being calculated, the data are expressed as follows.

$$D7t = X7 + \alpha \cdot X6 \tag{9}$$

$$E6t = X6 + \beta \cdot D5 \tag{10}$$

$$H5t = D5 + \gamma \cdot E4 \tag{11}$$

$$L4t = E4 + \delta \cdot H3 \tag{12}$$

If 2 data "X8 and X9" are inputted, to output "L4 and L5", the following calculations are performed.

$$D7 = D7t + \alpha \cdot X8 \tag{13}$$

$$E6 = E6t + \beta \cdot D7 \tag{14}$$

$$H5 = H5t + \gamma \cdot E6 \tag{15}$$

$$L4 = L4t + \delta \cdot H5 \tag{16}$$

Then data "D9t, E8t, H7t and L6t" to be held for calculation at the next cycle are obtained by:

$$D9t = X9 + \alpha \cdot X8 \tag{17}$$

$$E8t = X8 + \beta \cdot D7 \tag{18}$$

$$H7t = D7 + \gamma \cdot E6 \tag{19}$$

$$L6t = E6 + \delta \cdot H5 \tag{20}$$

The input data "X8 and X9" are inputted from terminals 3701 and 3702 of the first-stage calculation unit, and the results of calculation are outputted from terminals 3711 and 3712. The outputs are inputted into the terminals 3701 and 3702 of the next-stage calculation unit, and sequentially subjected to calculation processing.

Figure 25:
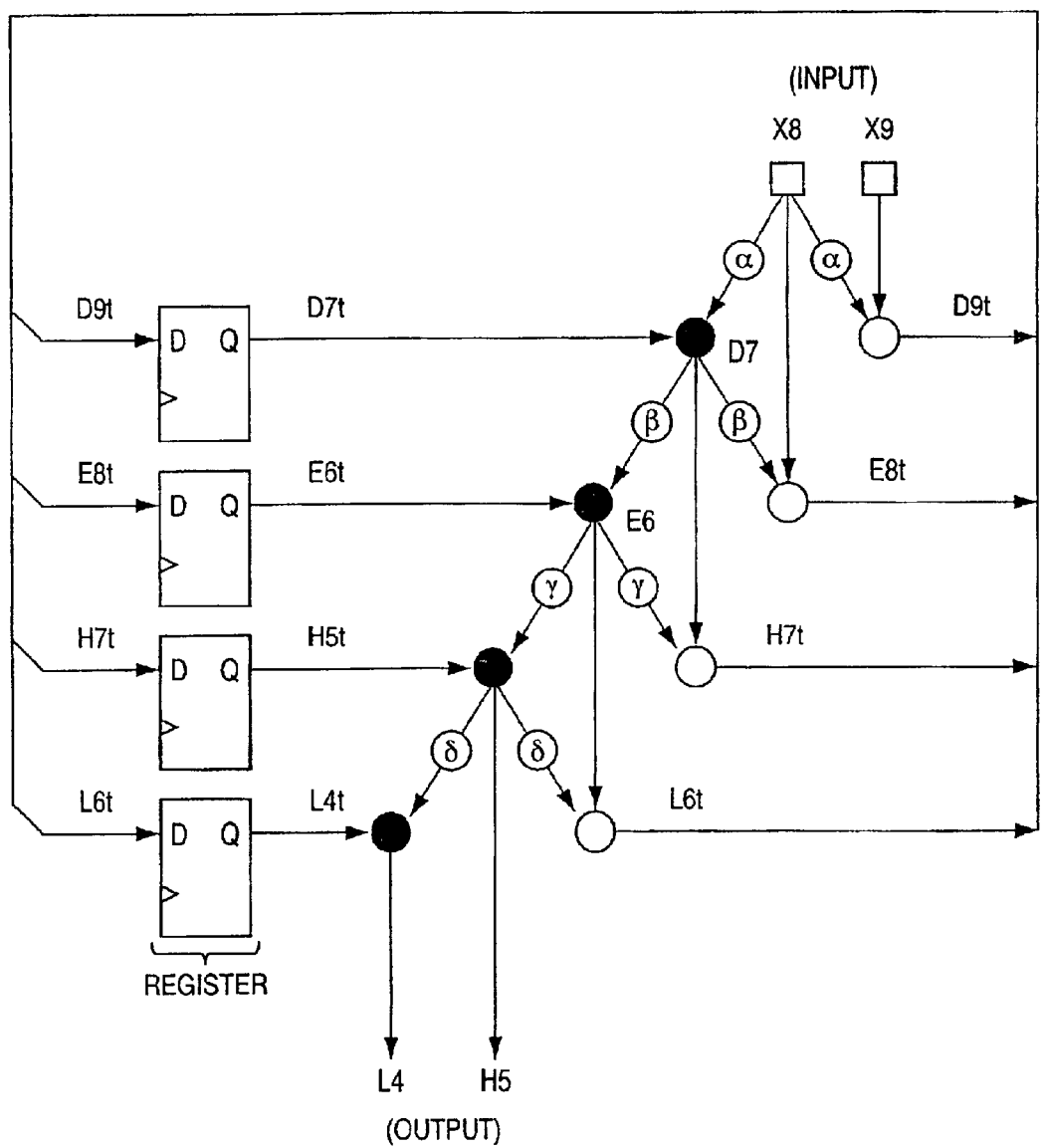
FIG. 25 is a block diagram showing a lifting grid structure for DWT calculation re-utilizing the result of calculation.

FIG. 25 represents the above processing as a lifting grid structure. In the figure, 4 registers hold the above-described in-calculation data. As shown in FIG. 22, the hardware construction is made by serially connecting the calculation unit shown in FIG. 24, thereby the above-described series of calculations can be realized.

Figure 28:
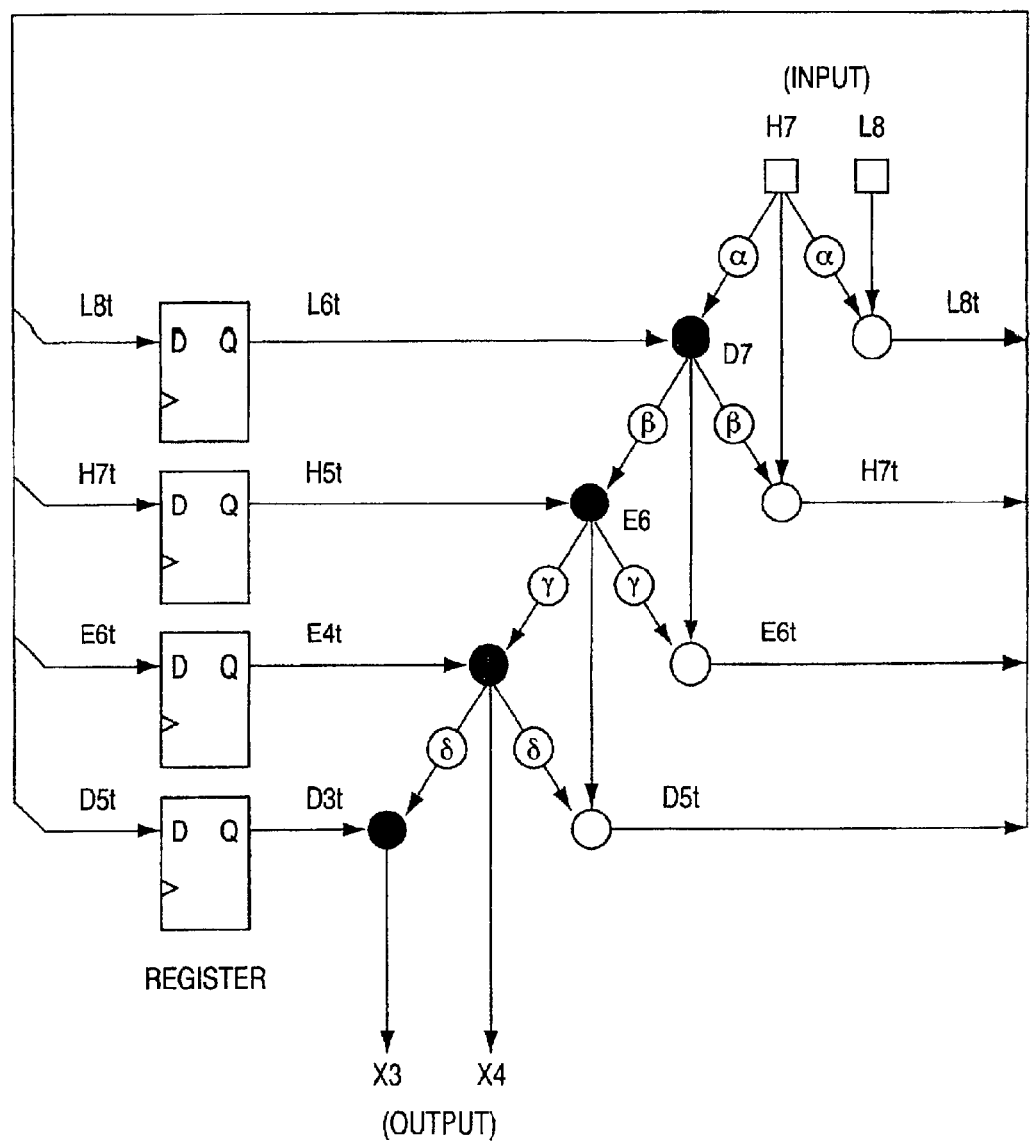
FIG. 28 is a block diagram showing the construction of the lifting grid structure for IDWT calculation re-utilizing the result of calculation.

In the case of the horizontal wavelet transform processing, a delay buffer in FIG. 24 has 1 stage of register as shown in FIG. 28 or plural registers. In the case of the vertical wavelet transform processing, the delay buffer has a line memory.

Accordingly, in the construction in FIG. 23 for the two-dimensional wavelet transform processing, the construction of the delay buffer in the calculation unit differs in front of and in the rear of the 2×2 data rotation unit.

Next, the sixth embodiment of the present invention will be described based on the above principle.

Figure 26:
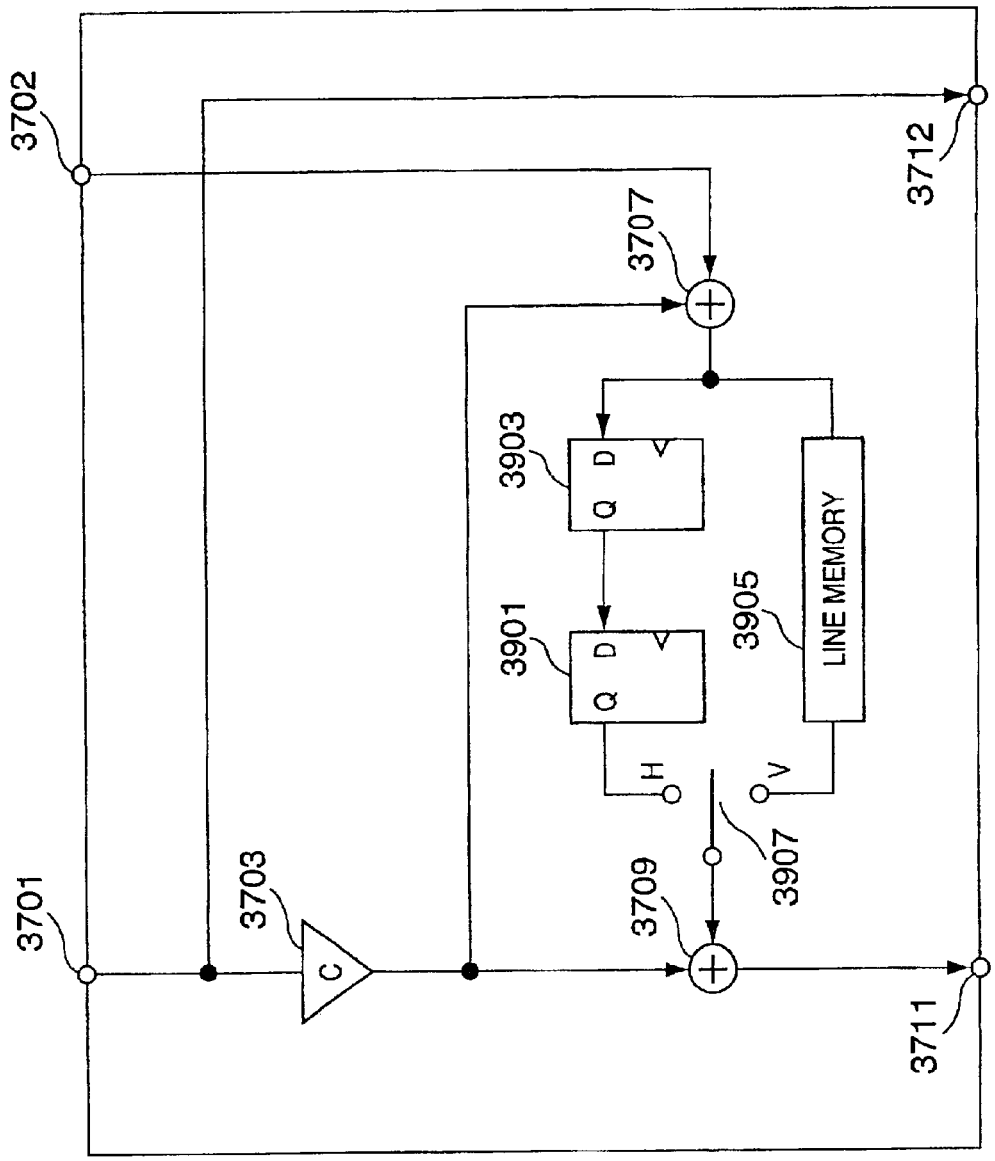
FIG. 26 is a block diagram showing the construction of the calculation unit used in a sixth embodiment of the present invention.

In the sixth embodiment, a calculation unit having a construction as shown in FIG. 26 is employed. In the calculation unit, the calculation unit shown in FIG. 24 has 2 types of buffers having different delay amounts and a selector for selecting the buffers.

In FIG. 26, numerals 3901 and 3903 denote registers having enable-control terminals, utilized in the horizontal wavelet transform processing; and 3905, a line memory having a capacity for storing data for horizontal 1 line, utilized in the vertical wavelet transform processing.

Numeral 3907 denotes a selector for selecting 1 of the outputs from the register 3901 and the line memory 3905. The horizontal transform processing and vertical transform processing are alternately performed selecting the 2 outputs by the selector every other 2 cycles.

When the elector selects the V terminal side, the vertical wavelet transform processing is performed, while when the selector selects the H terminal side, the horizontal wavelet transform processing is performed.

Figure 27:
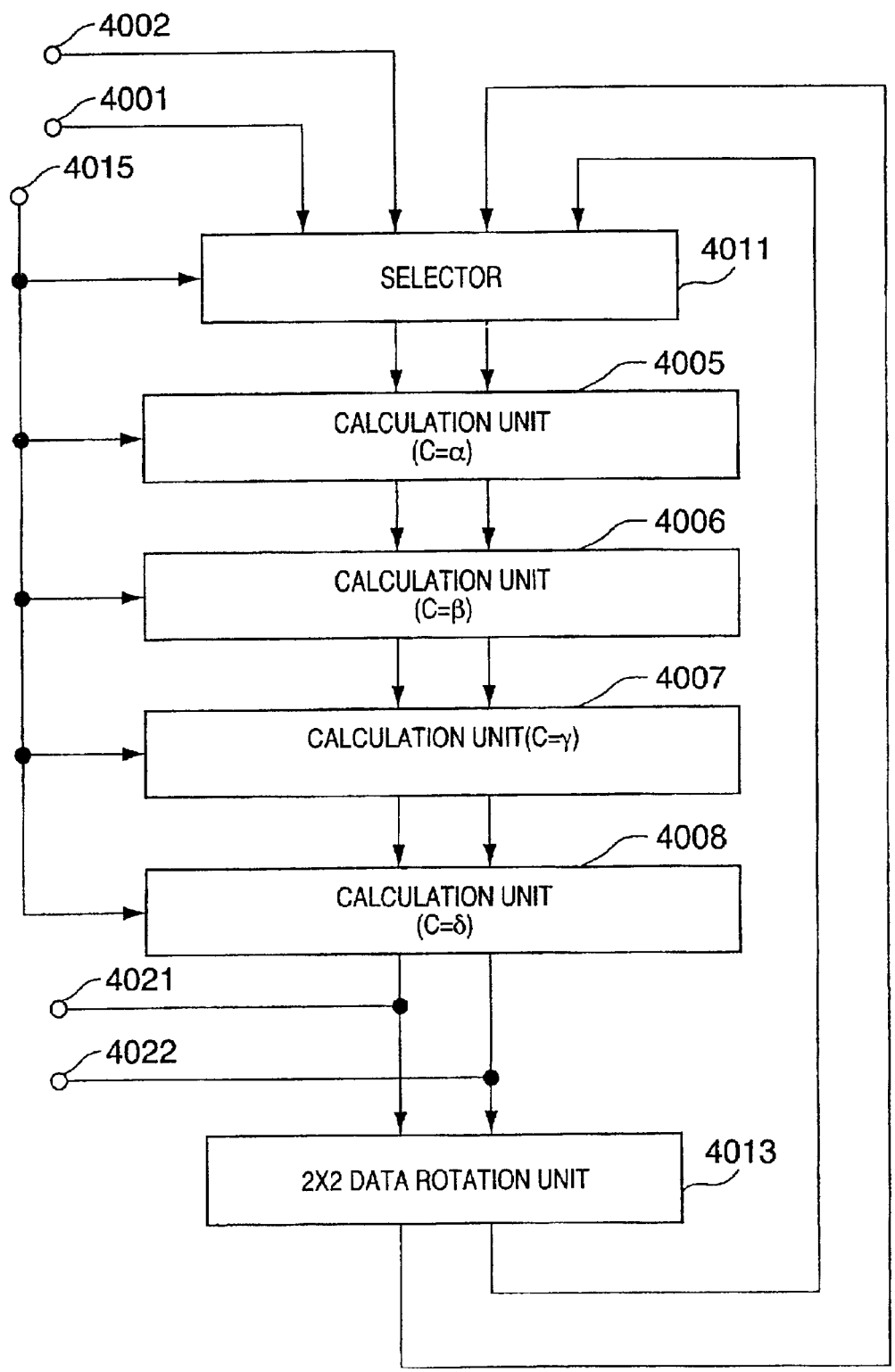
FIG. 27 is a block diagram showing the construction of the sixth embodiment.

FIG. 27 shows the entire construction of the two-dimensional wavelet transform processor using the calculation unit in FIG. 26. In the figure, numerals 4001 and 4002 denote terminals for inputting vertical 2 pixel data; 4005 to 4008, calculation units shown in FIG. 26 (note that the multiplication coefficients are different); 4011, a selector for selecting input data to the terminal 4001; 4013, a 2×2 data rotation unit for rearranging data obtained by four-dimensional wavelet transform processing in 2×2 units; and 4015, a terminal for inputting a control signal to control the selector for the 4 calculation units and the selector 4011.

The construction of the sixth embodiment shows a wavelet transform processor which performs low-frequency 9-tap and high-frequency 7-tap two-dimensional wavelet transform processing.

Vertical 2 pixel data are inputted every other 2 cycles into the terminals 4001 and 4002 while the data are horizontally scanned. The selector 4011 selects the data upon input cycle of the vertical 2 pixel data and sends the data to the calculation unit 4005. At other cycles, the selector selects output data from the 2×2 data rotation unit 4013 and similarly sends the data to the calculation unit 4005.

The 4 calculation units respectively enter the vertical wavelet transform mode or the horizontal wavelet transform mode in accordance with selection of selector by the control signal inputted from the terminal 4015.

At the cycle where the selector 4011 selects the vertical 2-sample input data, the calculation unit enters the vertical wavelet transform mode, while at the cycle where the selector selects the data from the 2×2 rotation unit 4013, enters the horizontal wavelet transform mode. The outline of the processor is as above. Next, the operation of the processor will be described.

It is assumed that processing for plural lines and plural pixels has been already completed, and the line memory and the registers in the calculation unit hold in-calculation data, and vertical 2-sample data are inputted at continuous 2 cycles.

The respective selectors of the 4 calculation units select the V terminal side, and the entire processor is in the vertical wavelet transform mode and operates for 2 cycles in this mode. As a result of 2 cycle operation, respectively 2 vertical low-frequency transform coefficients and high-frequency transform coefficients are sent to the 2×2 data rotation unit 4013.

Figure 33:
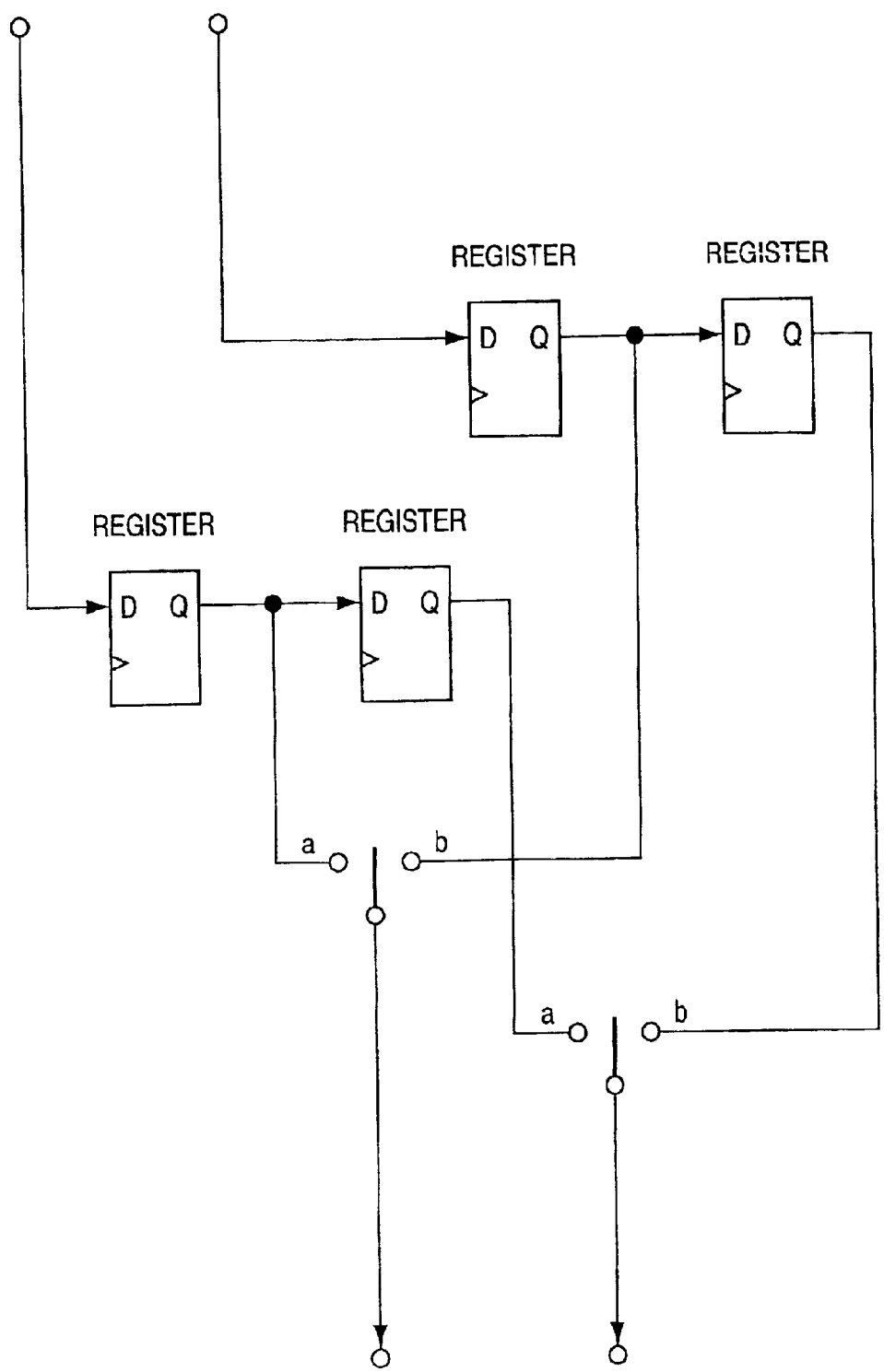
FIG. 33 is a block diagram showing the construction of a 2×2 data rotation unit.

The 2×2 data rotation unit 4013, having a construction as shown in FIG. 33, inputs the 2 pairs of low-frequency transform coefficient and high-frequency transform coefficient data into the 4 registers, separates the data into low-frequency transform coefficients and high-frequency transform coefficients, and outputs respectively 2 data for 2 cycles. The 4 registers are controlled by the control signal inputted to the enable terminal (not shown) not to input the next data until the read data are outputted.

The data inputted into the 4 registers are outputted at the 2 cycles immediately after the 2-cycle input of the vertical 2-sample data. At these cycles, the respective selectors in the 4 calculation units are switched to the H terminal side, and the entire processor operates in the horizontal wavelet transform mode.

The 2 registers in the respective calculation units utilized in the horizontal wavelet transform mode are controlled by the enable signal (not shown), and input and hold in-calculation data in the transform mode.

During the cycle where vertically low-frequency transformed coefficients are horizontally processed, the in-calculation data are outputted from the register 3901, and sent via the selector 3907 to the adder 3709. The horizontal low-frequency transform coefficient LL and high-frequency transform coefficient LH calculated at the cycle are outputted from the terminals 4021 and 4022, and the temporary results of in-calculation data are inputted into the register 3903 at the next cycle. The data obtained from the processing on the vertically high-frequency transform coefficients, held in the register 3903 by that time, are shifted to the register 3901 upon data input, and newly outputted from the register 3901.

At the next cycle, the vertically high-frequency transformed coefficients are horizontally processed using the data. As in the case of the above processing, the horizontal low-frequency transform coefficient HL and high-frequency transform coefficient HH are outputted from the terminals 4021 and 4022, and the temporary results of in-calculation data are inputted into the register 3903 at the next cycle. Data inputted into the register 3903 at the previous cycle are shifted to the register 3901. At this time, the data held in the 2 registers are held in the same registers for the next 2 cycles (vertical wavelet transform mode).

The horizontal wavelet transform mode is completed by the above processing, and the processor returns to the vertical wavelet transform mode. The above-described 4 cycle processing is repeated, thereby the two-dimensional wavelet transform processing can be performed on the entire image.

As 2 pairs of vertical 2-sample data i.e. 4 sample pixel data are received from the input terminals 4001 and 4002 and processed in the above 4 cycles, the processing rate is 1 sample per 1 cycle.

Note that in a case where the processing rate of 9/7 filter two-dimensional wavelet transform is 1 sample per 1 cycle, the present embodiment is an optimum construction in that only 4 constant multipliers are used for multiplication by constant coefficient.

The above description of the operation has been made for understanding of the most basic construction of the present invention, but pipeline processing for high speed processing has not been described. In actual hardware, pipeline processing is attained by inserting a register between the respective calculation units, reducing the calculation delay time, and increasing the operation frequency.

In such case, it takes 3 or 4 cycles to output the result of calculation processing on data inputted from the terminals 4001 and 4002 from the calculation unit 1008. Accordingly, the results of vertical wavelet transform cannot be immediately inputted into the selector 1011 such that horizontal wavelet transform processing is performed immediately later as in the case of the above description of the operation.

That is, even if the results of vertical wavelet transform are to be immediately subjected to the horizontal wavelet transform processing, the transform mode of the calculation unit immediately subsequent to the output of the result of transform is not the horizontal wavelet transform mode, in accordance with operation timing. As the transform mode changes every other 2 cycles, if the processing waits for up to 2 cycle, the mode changes to the horizontal wavelet transform mode, and the transformed output can be subjected to the horizontal wavelet transform.

Accordingly, the number of registers increase in the 2×2 data rotation unit. In a case where pipeline processing is not performed, the same register can be used for storing the results of vertical transform processing and for storing the results of horizontal transform processing. However, if operation timing becomes off due to the above-described pipeline processing, 2 types of registers must be separately provided.

However, whether pipeline processing is made or not, the following processings are the same. That is, the calculation unit basically performs the vertical transform processing for 2 cycles, then performs the horizontal transform processing for 2 cycles. Also, the selector 4011 performs selection operation every other 2 cycles.

Hereinbelow, various modifications and applications will be described.

In a case where the registers 3901 and 3903 are not provided with the enable terminal, i.e., the registers merely inputs data when a clock is inputted into the registers, the above function can be realized by arraying 4 registers. Among these 4 registers, only 2 registers hold data significant for transform processing, and the other 2 registers hold insignificant data. The insignificant data can be ignored by control of selection timing of the selector 3907 so as not to select the insignificant data by the selector.

In the above-described embodiments, vertical 2-sample data are inputted at every other 2 cycles, however, even if the data are inputted at alternate cycles, the two-dimensional wavelet transform processing can be made. In this case, the selection between the vertical wavelet transform mode and the horizontal wavelet transform mode is performed at alternate cycles. As more particular control, the selection of the selector 3907 is performed at alternate cycles, and the input of in-calculation data into the register 3903 is performed at alternate cycles. In this manner, except that the control is slightly different, the construction of the calculation system is the same as that of the above-described embodiments.

In the above description, the vertical wavelet transform processing is performed and then the horizontal wavelet transform processing is performed, however, the vertical wavelet transform processing may be performed after the horizontal wavelet transform processing. In this case, data inputted from the terminals 4001 and 4002 are horizontal 2 sample data. The input data are subjected to the horizontal wavelet transform processing. The horizontal 2 sample data may be inputted every other 2 cycles or may be inputted at alternate cycles. Note that the input is not made such that data of the same line are simply scanned and inputted, but is made such that 2 line data are alternately inputted while being scanned.

The 2 lines correspond to 2 lines, to which the 2 sample data belong, in the case of input of the above-described vertical 2 sample data.

As 2 line data are alternately inputted, horizontal low-frequency transform coefficients and high-frequency transform coefficients for the 2 lines are stored in the 2×2 data rotation unit. The 2×2 data rotation unit rotates the data by 90° thus rearranges the data to respectively vertical 2-sample low-frequency transform coefficients and high-frequency transform coefficients, and inputs the data into the calculation unit 4005 via the selector 4011 during an idle cycle period in which the horizontal 2 sample data are not inputted. At this time, the 4 calculation units 4005 to 4008 operate in the vertical wavelet transform mode.

By the above operation, the horizontal wavelet transform processing is performed and then the vertical wavelet transform processing is performed. The processing in this order can be handled with the same construction as that in FIG. 10 only by changing the control method.

Since the original image cannot be reproduced by performing inverse wavelet transform on the wavelet-transformed coefficients, a function of performing the inverse wavelet transform is required.

The inverse wavelet transform is performed based on a lifting grid structure as shown in FIG. 28, by the following calculations. First, to output "X3 and X4", the following calculations are made.

$$E6 = L6t - \delta \cdot H7 \tag{21}$$

$$D5 = H5t - \gamma \cdot E6 \tag{22}$$

$$X4 = E4t - \beta \cdot D5 \tag{23}$$

$$X3 = D3t - \alpha \cdot X4 \tag{24}$$

The remaining data are calculated as follows.

$$L8t = L8 - \delta \cdot H7 \tag{25}$$

$$H7t = H7 - \gamma \cdot E6 \tag{26}$$

$$E6t = E6 - \delta \cdot D5 \tag{27}$$

$$D5t = D5 - \alpha \cdot X4 \tag{28}$$

The data "L6t, H5t, E4t and D3t" are intermediate data received for the above calculations, and the data "L8t, H7t, E6t and D5t" are data left for the next calculations. Accordingly, the calculation processing can be repeated by shifting the position by 2 samples.

In comparison with the lifting grid structure shown in FIG. 25 representing the forward wavelet transform calculation, except that the order of multiplication coefficients is inversed and the multiplication coefficients have "−" symbol, the structure in FIG. 28 has the same as that in FIG. 25.

Accordingly, the inverse wavelet transform processing can be performed only by modifying a part of the construction of the present embodiment. More particularly, there are 2 methods as follows.

(1) 2 multipliers are selectively used in 1 calculation unit.
(2) The adder in the calculation unit is changed to an adder/subtracter, such that the adder/subtracter is used as an adder upon forward transform processing while the adder/subtracter is used as a subtracter upon inverse transform processing. Further, upon inverse transform processing, the flow of data is changed such that processed data flows through the calculation unit in the descending order, 4008→4007→4006→4005. This operation can be controlled by using the selector or the like.

The inverse wavelet transform processing can be performed by the construction as described above.

Figure 30:
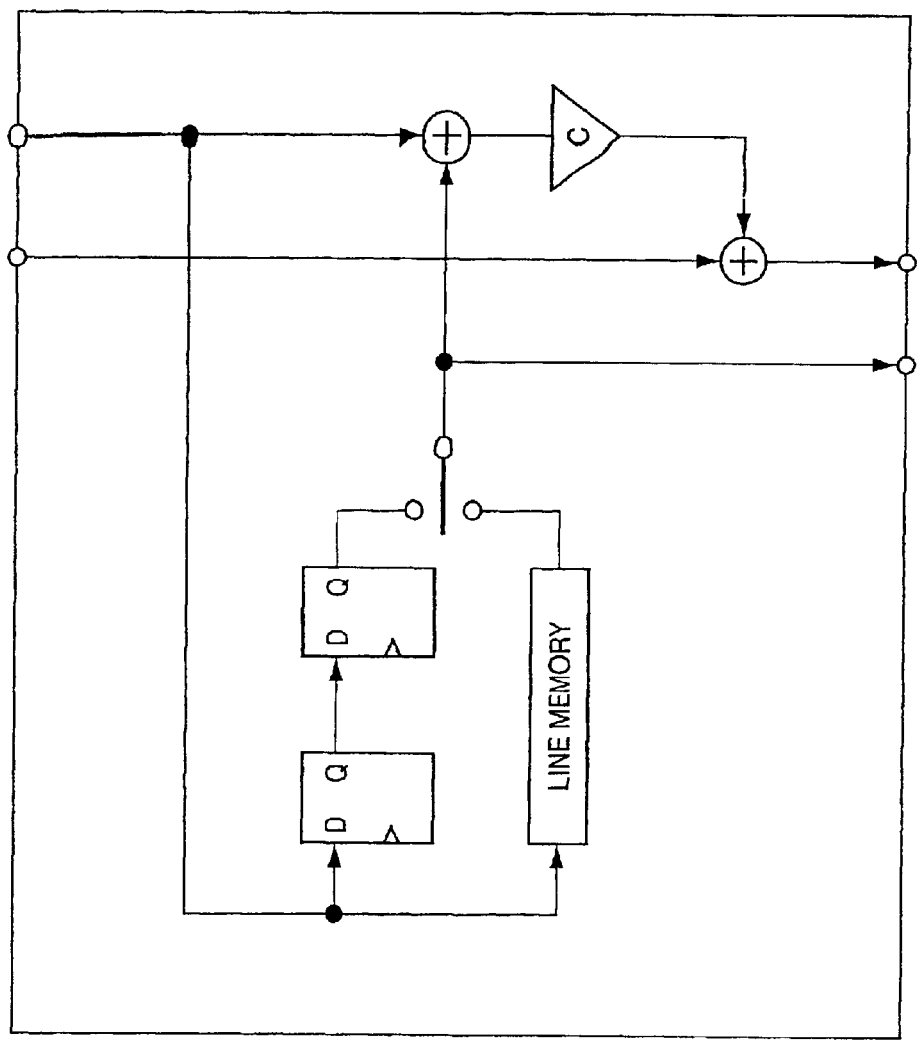
FIG. 30 is a block diagram showing the construction of the calculation unit in FIG. 29 modified for use in the sixth embodiment.

Further, the present invention is also applicable to a case where a calculation unit, having a construction as shown in FIG. 30 having 2 types of buffers having different delay amounts and a selector for selection of buffer, is serially-connected to the calculation unit having a construction as shown in FIG. 29, and wavelet transform processing is performed by using these units.

<Seventh Embodiment>

In the seventh embodiment, the two-dimensional wavelet transform processing is performed by a construction where the calculation units, respectively performing the vertical wavelet transform processing and the horizontal wavelet transform processing, are serially connected, with the 2×2 data rotation unit held therebetween.

Figure 31:
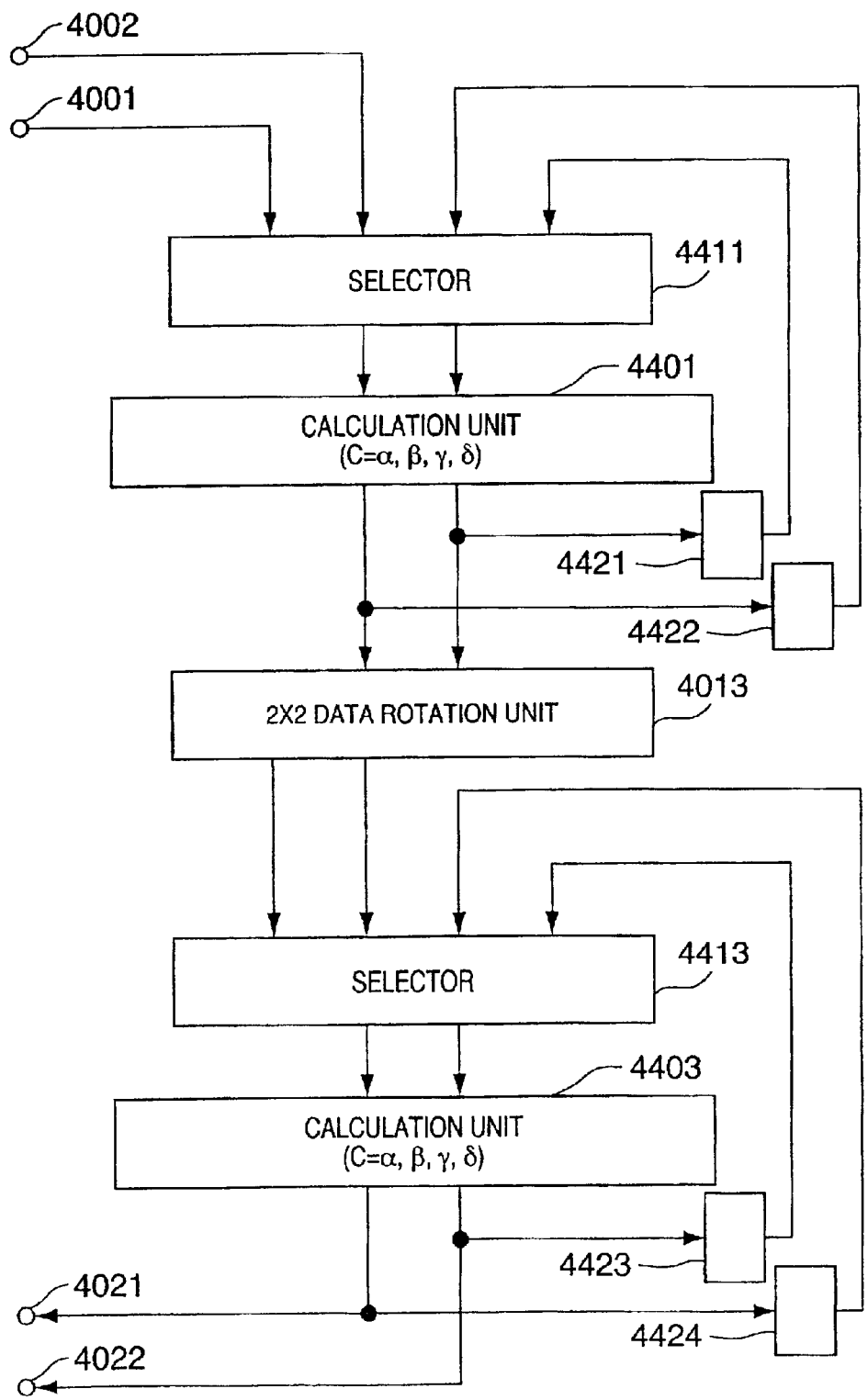
FIG. 31 is a block diagram showing the construction of a seventh embodiment of the present invention.

FIG. 31 shows the construction of the seventh embodiment. In the figure, numeral 4401 denotes a calculation unit for the vertical wavelet transform; 4403, a calculation unit for the horizontal wavelet transform; 4411 and 4413, selectors respectively for selecting data to be inputted into the respective calculation units; and 4421 to 4424, registers for holding processed data to be re-inputted into the calculation units. The other constituent elements corresponding to those in the above-described sixth embodiment in FIG. 27 have the same reference numerals.

In the constructions as described above, to perform the 9/7 filter one-dimensional wavelet transform processing, 4 calculation units are required as shown in FIG. 22.

To perform this processing by 1 calculation unit, it is necessary to repeatedly input and process data outputted from the calculation unit. The selectors 4411 and 4413 control the flow of data for this processing.

Vertical 2 sample data inputted from the terminals 4001 and 4002 are selected by the selector 4411 and inputted into the calculation unit 4401. the calculation unit 4401 performs the lifting calculation by using the multiplication coefficient $\alpha$ as the first step calculation, and outputs the results of calculation.

The output results of calculation are held in the registers 4421 and 4422, then inputted into the selector 4411, then selected by the selector and re-inputted into the calculation unit 4401. The calculation unit 4401 performs the second step calculation.

The results of calculation outputted from the calculation unit are held in the registers 4421 and 4422, then similarly re-inputted via the selector 4411 into the calculation unit. The calculation unit 4401 performs the third step calculation and the fourth step calculation. At the second to fourth steps, the lifting calculation is performed using the multiplication coefficients $\beta$, $\gamma$ and $\delta$.

The results of the fourth step calculation are low-frequency and high-frequency coefficients as the results of the vertical wavelet transform processing.

The transform coefficients are sent to the 2×2 data rotation unit 4013. When 2 pairs of low-frequency and high-frequency transform coefficients are inputted into the 2×2 data rotation unit, the unit rearranges the data to 2 low-frequency transform coefficients and 2 high-frequency transform coefficients, i.e., 2 sets of horizontal 2 sample data and outputs the data.

The coefficient data are selected by the selector 4413 and inputted into the calculation unit 4403. As in the case of the calculation unit 4401, the calculation unit 4403 performs the first to fourth step calculations. The data outputted from the calculation unit are held in the registers 4423 and 4424, then re-inputted via the selector 4413 into the calculation unit 4403. At 3 cycles after input of new data, the selectors 4411 and 4413 re-input data outputted from the latter-stage calculation unit 4403.

When the low-frequency transform coefficients, outputted from the 2×2 data rotation unit 4013 prior to the high-frequency transform coefficients, have been calculation-processed at the above-described first to fourth steps, the high-frequency transform coefficients, outputted from the 2×2 data rotation unit 4013 subsequently to the low-frequency transform coefficients, are inputted via the selector 4413 into the calculation unit 4404 and processed there.

The results of the first to fourth step calculations by the calculation unit 4403 are horizontal low-frequency and high-frequency transform coefficients, further divided from the above-described vertical low-frequency and high-frequency transform coefficients, i.e., 4 types of transform coefficients obtained by the two-dimensional wavelet transform processing. The transform coefficients are outputted from the terminals 4021 and 4022 to the outside 2 times.

The buffer in the calculation unit 4401 must have a capacity for 4 times larger than that of the line memory shown in FIG. 26 as a delay buffer. The line memory may be a large line memory having the necessary capacity, or may be 4 line memories respectively having the same capacity as that of the line memory in FIG. 26 which are selectively used in correspondence with calculation step.

As the calculation unit 4403 performs the first to fourth step calculations on the 2 types of data, 8 types of in-calculation data are required. Accordingly, the delay buffer in the calculation unit may have 8 stages of registers for storing the in-calculation data.

As in the case of the above-described sixth embodiment, the same processing can be performed by the calculation unit having the construction in FIG. 29 by using the above-described delay unit in the calculation unit.

<Eighth Embodiment>

The eighth embodiment has a construction as a combination of the above-described sixth and seventh embodiments, in which the number of calculation units is further reduced.

In the above-described sixth embodiment, the common calculation unit group alternately performs the vertical wavelet transform processing and the horizontal wavelet transform processing. In the above-described seventh embodiment, the single calculation unit performs plural calculation steps of one-dimensional wavelet transform processing.

Figure 32:
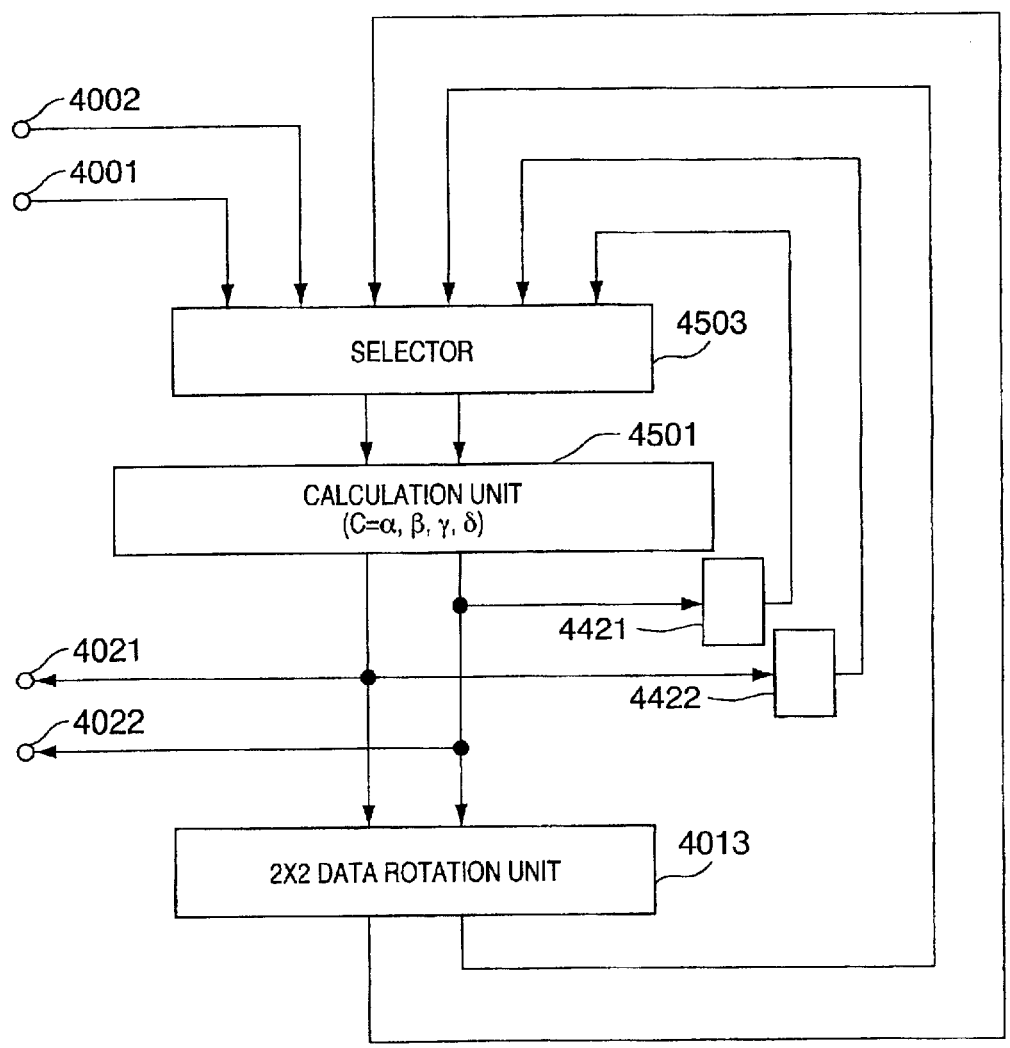
FIG. 32 is a block diagram showing the construction of an eighth embodiment of the present invention.

In the present embodiment, 1 calculation unit performs all the plural calculation steps of horizontal and vertical wavelet transform processing. FIG. 32 shows the construction of the present embodiment.

In the figure, numeral 4501 denotes a calculation unit for performing all the calculations of the two-dimensional wavelet transform; and 4503, a selector having 3 types of 2 inputs, for selecting 1 of 3 types of 2 inputs. The other constituent elements have the same reference numerals as those of corresponding elements in FIG. 31.

As in the case of the above-described seventh embodiment, 1 pair of input data or transform coefficients is subjected to the above-described first to fourth steps of calculations at continuous 4 cycles. As 2 pairs of input data and 2 pairs of transform coefficients obtained by wavelet transform processing the 2 pairs of input data, i.e., 4 pairs of data are used as the minimum processing unit, transform processing is performed in a 16 cycle period.

At the first-half 8 cycles of the 16 cycle period, the vertical wavelet transform processing is performed on 2 pairs of input data. At this time, the calculation unit 4501 performs processing equal to the processing by the calculation unit 4401 in FIG. 31. The 2 pairs of transform coefficients resulted from the vertical wavelet transform are inputted into the 2×2 data rotation unit 4013, then rearranged to 2 vertical low-frequency transform coefficients and 2 high-frequency transform coefficients, i.e., 2 pairs of horizontal 2 sample data, and outputted.

At the second-half 8 cycles of the 16 cycle period, the 2 pairs of transform coefficients outputted from the 2×2 data rotation unit are held in the registers 4421 and 4422, then re-inputted via the selector 4503 into the calculation unit, and subjected to the horizontal wavelet transform processing. At this time, the calculation unit 4501 performs processing equal to the processing by the calculation unit 4403 in FIG. 31.

The transform coefficients obtained by the two-dimensional wavelet transform processing are outputted from the terminals 4021 and 4022.

As the calculation unit 4501 in the present embodiment performs the horizontal wavelet transform processing and the vertical wavelet transform processing, the calculation unit has the delay buffers of the 2 calculation units 4401 and 4403 in the above-described seventh embodiment.

Further, the calculation unit in FIG. 29 may be extended for used in the present embodiment.

As described above, according to the sixth to eighth embodiments, the horizontal and vertical filtering processing such as wavelet transform processing can be realized with a very simple construction, and the hardware scale can be further reduced.

Note that in the above-described embodiments, only the wavelet transform (and the inverse wavelet transform) has been described, however, as the present invention is applicable to horizontal and vertical filtering on two-dimensional information such as image data, the invention is not limited by its purpose.

Further, the circuit construction described in the above-described embodiments is applicable to an encoder and decoder card to be inserted into a bus slot (e.g. a PCI bus slot) of e.g. a personal computer.

As described above, according to the present invention, the hardware structure for performing horizontal and vertical filtering processing on two-dimensional information can be simplified. Accordingly, in a case where the invention is applied to wavelet transform in the JPEG 2000 or the like, the apparatus related to the transform can be downsized, and a sufficient processing speed can be attained.

As many apparently widely different embodiments of the present invention can be made without departing from the spirit and scope thereof, it is to be understood that the invention is not limited to the specific embodiments thereof except as defined in the appended claims.

What is claimed is:

1. A filter processing apparatus comprising:
   first filter processing means for performing filter processing on image data and outputting 2 types of data obtained by the processing as 1 pair of data;
   data rotation means for rearranging the data outputted from said first filter processing means by rotating the data by 90° by 2 pairs and outputting the data; and
   second filtering means for performing filter processing on the image data rearranged by said data rotation means and outputting 2 types of data obtained by the processing as 1 pair of data.

2. The filter processing apparatus according to claim 1, wherein said first and second filtering means perform forward wavelet transform processing, and wherein the 2 types of data included in said 1 pair of data are a high-frequency transform coefficient and a low-frequency transform coefficient.

3. The filter processing apparatus according to claim 1, wherein said first and second filter processing means perform inverse wavelet transform processing, and input and process 1 pair of data including a high-frequency transform coefficient and a low-frequency transform coefficient.

4. The filter processing apparatus according to claim 1, wherein image data for 2 pixels arrayed in a vertical direction are inputted in parallel as the 1 pair of data.

5. The filter processing apparatus according to claim 4, wherein said first filter processing means performs vertical filter processing, and wherein said second filter processing means performs horizontal filter processing.

6. The filter processing apparatus according to claim 4, further comprising input data rotation means, provided in a previous stage of said first filter processing means, for rearranging input image data by rotating the data by 90° by 2 pairs and outputting the data,
   wherein said first filter means performs horizontal filter processing, and wherein said second filter means performs vertical filter processing.

7. The filter processing apparatus according to claim 1, wherein said first filter process means is an FIR filter.

8. The filter processing apparatus according to claim 7, further comprising input means for inputting image data in 2 line units into said first filter process means,
   wherein said input means inputs the image data by alternate lines for pixels necessary for the processing by said first filter processing.

9. A filter processing apparatus comprising:
   first filter processing means for performing filter processing on image data and outputting 2 types of data obtained by the processing as 1 pair of data;
   storage means for temporarily storing the data outputted from said first filter process means by each type, and alternately outputting each type of data for 2 pixels arrayed in a vertical direction as 1 pair; and
   second filter processing means for performing filter processing on the data outputted from said storage means and outputting 2 types of data obtained by the processing as 1 pair of data.

10. The filter processing apparatus according to claim 9, wherein said first and second filter processing means perform forward wavelet transform processing, and wherein the 2 types of data included in said 1 pair of data are a high-frequency transform coefficient and a low-frequency transform coefficient.

11. The filter processing apparatus according to claim 9, wherein said first and second filter processing means perform inverse wavelet transform processing, and wherein the 2 types of data included in said 1 pair of data are a high-frequency transform coefficient and a low-frequency transform coefficient] input and process 1 pair of data including a high-frequency transform coefficient and a low-frequency transform coefficient.

12. The filter processing apparatus according to claim 9, wherein said first filter process means is an FIR filter.

13. The filter processing apparatus according to claim 9, wherein said first filter processing means performs horizontal filter processing, and wherein said second filter processing means performs vertical filter processing.

14. A filter processing apparatus comprising:
   filter processing means for performing filter processing on image data while selecting a first mode or a second mode, and outputting 2 type of data obtained by the processing as 1 pair of data;
   data rotation means for rearranging 2 pairs of data outputted from said filter process means by rotating the data by 90° and outputting the data; and first selection means for selecting image data inputted from outside or the image data rearranged by said data rotation means, and inputting selected image data to said filter process means, wherein if said first selection means selects the image data inputted from the outside, said filter process means performs the filter processing in the first mode, while if said first selection means selects the image data inputted from said data rotation means, aid filter process means performs the filter processing in the second mode.

15. The filter processing apparatus according to claim 14, further comprising second selection means for selectively outputting the data outputted from said filter process means to said data rotation means or the outside.

16. The filter processing apparatus according to claim 14, wherein in said first mode, said filter process means performs horizontal filter processing, while in said second mode, said filter process means performs vertical filter processing.

17. A filter processing apparatus for performing two-dimensional filter processing on two-dimensional digital data, comprising:

a calculation unit having a multiplier and an adder for filter calculation processing, horizontal delay means and vertical delay means having different delay amounts corresponding to horizontal and vertical directions, wherein outputs from said horizontal and vertical delay means or contents of calculation by said calculation unit are selected at predetermined cycles, and wherein output data from each calculation unit are re-inputted at least once to the same calculation unit and processed in said unit.

18. The filter processing apparatus according to claim 17, wherein said filter processing is wavelet transform.

19. The filter processing apparatus according to claim 18, wherein plural calculation units are serially connected, and wherein an output from a last calculation unit is outputted as filter processed data, further wherein the output data are rotated in 2×2 units, further wherein the rotated data are re-inputted into an initial calculation unit.

20. The filter processing apparatus according to claim 17, wherein the multiplier in said calculation unit selects one of plural multiplication coefficients, and wherein the multiplier selects one of the multiplication coefficients at every circulation of processed data.

21. The filter processing apparatus according to claim 17, wherein a period of selection between the outputs from said horizontal and vertical delay means and the contents of calculation by said calculation unit is shorter than a period in which all the contents held by said vertical delay means is updated with new contents.

* * * * *

UNITED STATES PATENT AND TRADEMARK OFFICE
CERTIFICATE OF CORRECTION

PATENT NO. : 6,904,177 B2
DATED : June 7, 2005
INVENTOR(S) : Tadayoshi Nakayama

It is certified that error appears in the above-identified patent and that said Letters Patent is hereby corrected as shown below:

Column 5,
Line 61, "unit;" should read -- unit. --.

Column 8,
Line 61, "rearrange" should read -- rearranges --.
Line 64, "shows" should read -- show --.

Column 9,
Line 11, "perform" should read -- performs --.

Column 15,
Line 4, "data i.e." should read -- data, i.e., --.

Column 17,
Line 14, "elector" should read -- selector --.

Column 18,
Line 45, "data i.e." should read -- data, i.e., --.

Column 19,
Line 8, "cycle," should read -- cycles, --.
Line 11, "increase" should read -- increases --.
Line 29, "inputs" should read -- input --.

UNITED STATES PATENT AND TRADEMARK OFFICE
CERTIFICATE OF CORRECTION

PATENT NO. : 6,904,177 B2
DATED : June 7, 2005
INVENTOR(S) : Tadayoshi Nakayama

It is certified that error appears in the above-identified patent and that said Letters Patent is hereby corrected as shown below:

<u>Column 23,</u>
Line 33, "(e.g." should read -- (e.g., --.
Line 34, "of e.g." should read -- of, e.g., --.

<u>Column 24,</u>
Line 47, "wherein the" should be deleted.
Lines 48 and 49, should be deleted.
Line 50, "transform coefficient]" should be deleted.
Line 63, "type" should read -- types --.

<u>Column 25,</u>
Line 9, "aid" should read -- said --.

Signed and Sealed this

Twenty-first Day of March, 2006

JON W. DUDAS
*Director of the United States Patent and Trademark Office*